US012634897B2

(12) United States Patent　　　　　(10) Patent No.:　US 12,634,897 B2
Arzani et al.　　　　　　　　　　　　　(45) Date of Patent:　　May 19, 2026

(54) SOLVING MAX-MIN FAIR RESOURCE ALLOCATION AT LARGE SCALE

(71) Applicant: Microsoft Technology Licensing, LLC, Redmond, WA (US)

(72) Inventors: Behnaz Arzani, Redmond, WA (US); Pooria Namyar, Los Angeles, CA (US); Srikanth Kandula, Redmond, WA (US); Umesh Krishnaswamy, San Jose, CA (US); Himanshu Raj, Cupertino, CA (US); Santiago Martin Segarra, Houston, TX (US); Daniel Stopol Crankshaw, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 390 days.

(21) Appl. No.: 18/323,126

(22) Filed: May 24, 2023

(65) Prior Publication Data

US 2024/0314747 A1　　Sep. 19, 2024

Related U.S. Application Data

(60) Provisional application No. 63/488,717, filed on Mar. 6, 2023.

(51) Int. Cl.
*H04W 72/044*　　(2023.01)
*H04W 72/512*　　(2023.01)

(52) U.S. Cl.
CPC ....... *H04W 72/044* (2013.01); *H04W 72/512* (2023.01)

(58) Field of Classification Search
CPC .... H04W 72/044; H04W 72/512; G06N 5/01; G06F 9/5011; H04L 41/0823;
(Continued)

(56) References Cited

U.S. PATENT DOCUMENTS 6,842,428 B2 * 1/2005 Chen ...................... H04L 67/61
　　　　　　　　　　　　　　　　　　　370/468
10,333,863 B2 * 6/2019 Klots .................... H04L 47/805
(Continued)

OTHER PUBLICATIONS

"Gurobi Optimizer Reference Manual, 2022", Retrieved from: https://www.gurobi.com/documentation/9.5/refman/index.html, 2022, 46 Pages.
(Continued)

*Primary Examiner* — Eunsook Choi
(74) *Attorney, Agent, or Firm* — Alleman Hall LLP

(57) ABSTRACT

A method for allocating a plurality of network resources to a plurality of network-access demands of a plurality of network guests comprises (a) receiving the plurality of network-access demands; (b) for each of the plurality of network-access demands (i) dynamically computing, from among the plurality of network resources, a resorted order of resources associated with the network-access demand, and (ii) for each network resource associated with the network-access demand, increasing, in the re-sorted order, an allo-cation of the network resource to the network-access demand until the network-access demand is saturated, and freezing the allocation of each of the plurality of network resources to the saturated demand; and (c) outputting the frozen allocation of each of the plurality of network resources for each of the plurality of network-access demands.

18 Claims, 17 Drawing Sheets

(58) Field of Classification Search

CPC ... H04L 41/142; H04L 41/5019; H04L 43/08; H04L 47/83; H04L 41/0896

See application file for complete search history.

(56) References Cited

U.S. PATENT DOCUMENTS

| | | | | |
|---|---|---|---|---|
| 11,398,984 | B1 * | 7/2022 | Ros-Giralt | H04L 47/24 |
| 2013/0121146 | A1 | 5/2013 | Hassidim et al. | |
| 2016/0149829 | A1 | 5/2016 | Lu et al. | |
| 2017/0318565 | A1 * | 11/2017 | Golitschek Edler von Elbwart ... | H04W 72/23 |
| 2017/0332440 | A1 * | 11/2017 | Xu | H04B 1/713 |
| 2018/0359337 | A1 * | 12/2018 | Kodaypak | H04L 12/1886 |
| 2022/0060943 | A1 * | 2/2022 | Soleil | H04M 15/8044 |
| 2022/0287070 | A1 * | 9/2022 | Hu | H04L 5/0053 |
| 2022/0360461 | A1 * | 11/2022 | Raleigh | H04W 28/0221 |

OTHER PUBLICATIONS

"Microsoft philly trace", Retrieved from: https://github.com/msr-fiddle/philly-traces, Aug. 31, 2019, 6 Pages.

Abuzaid, et al., "Contracting Wide-Area Network Topologies To Solve Flow Problems Quickly", In Proceedings of 18th USENIX Symposium on Networked Systems Design and Implementation, Apr. 12, 2021, pp. 175-200.

Alipourfard, et al., "Risk Based Planning Of Network Changes In Evolving Data Centers", In Proceedings of 27th ACM Symposium on Operating Systems Principles, Oct. 27, 2019, pp. 414-429.

Applegate, et al., "Making Intradomain Routing Robust To Changing And Uncertain Traffic Demands: Understanding Fundamental Tradeoffs", In Conference on Applications, Technologies, Architectures, and Protocols for Computer Communications, Aug. 25, 2003, pp. 313-324.

Batcher, K.E., "Sorting Networks and their Applications", In Proceedings of Spring Joint Computer Conference, Apr. 30, 1968, pp. 307-314.

Bertsekas, et al., "Data Networks", Retrieved from: https://web.mit.edu/dimitrib/www/Contents_Data_Nets.pdf, 1987, 11 Pages.

Bertsimas, et al., "Introduction to Linear Optimization", In book of Athena scientific, 1997, vol. 6, Jan. 1997, 4 Pages.

Bistritz, et al., "My Fair Bandit: Distributed Learning of Maxmin Fairness with Multi-player Bandits", In International Conference on Machine Learning, Nov. 21, 2020, 11 Pages.

Bogle, et al., "Teavar: Striking the Right Utilizationavailability Balance in Wan Traffic Engineering", In Proceedings of the ACM Special Interest Group on Data Communication, Aug. 19, 2019, pp. 29-43.

Bonald, et al., "A Queueing Analysis of Max-Min Fairness, Proportional Fairness And Balanced Fairness", In Journal of Queueing Systems, vol. 56, Jun. 1, 2006, pp. 65-88.

Bonald, et al., "On performance bounds for balanced fairness", In Journal of Performance Evaluation, vol. 55, Issue 1-2, Jan. 1, 2004, 26 Pages.

Byod, et al., "Convex optimization", In Book of Convex Optimization, Mar. 8, 2004, pp. 1-67.

Chaudhary, et al., "Balancing efficiency and fairness in heterogeneous gpu clusters for deep learning", In Proceedings of the Fifteenth European Conference on Computer Systems, Apr. 17, 2020, 16 Pages.

Danna, et al., "A practical algorithm for balancing the max-min fairness and throughput objectives in traffic engineering", In Proceedings of IEEE Infocom, Mar. 25, 2012, pp. 846-854.

Danna, et al., "Upward max-min fairness", In Journal of the ACM, vol. 64, Issue 1, Mar. 24, 2017, pp. 1-24.

Diamond, et al., "Cvxpy: A pythonembedded modeling language for convex optimization", In Journal of Machine Learning Research, Jan. 1, 2016, pp. 1-5.

Gersht, et al., "Joint optimization of data network design and facility selection", In journal of IEEE Journal on Selected Areas in Communications, Dec. 1, 1990, pp. 1667-1681.

Ghodsi, et al., "Choosy: Max-min fair sharing for datacenter jobs with constraints", In Proceedings of the 8th ACM European Conference on Computer Systems, Apr. 15, 2013, pp. 365-378.

Gogu, et al., "Max-min fair link quality in wsn based on sinr", In Journal of applied mathematics, Jun. 23, 2014, pp. 1-12.

Hong, et al., "Achieving high utilization with software-driven wan", In Proceedings of the ACM SIGCOMM 2013 conference on SIGCOMM, Aug. 27, 2013, pp. 15-26.

Jain, et al., "B4: Experience with a globally-deployed software defined wan", In Proceedings of the ACM SIGCOMM 2013 conference on SIGCOMM, Aug. 27, 2013, pp. 3-14.

Jain, et al., "Throughput fairness index: An explanation", In Book of ATM Forum contribution, vol. 99, 1999, Feb. 1999, pp. 1-13.

Jose, et al., "A distributed algorithm to calculate max-min fair rates without per-flow state", Proceedings of the ACM on Measurement and Analysis of Computing Systems, vol. 3, Issue 2, Jun. 24, 2019, pp. 57-58.

Kandula, et al., "Walking the tightrope: Responsive yet stable traffic engineering", In Proceedings of ACM SIGCOMM Computer Communication Review, vol. 35, Issue 4, Aug. 22, 2005, pp. 253-264.

Knight, et al., "The Internet Topology Zoo", Retrieved From http://www.topology-zoo.org/, Apr. 16, 2013, 2 Pages.

Krishnaswamy, et al., "Decentralized cloud wide-area network traffic engineering with Blastshield", In Proceedings of the 19th USENIX Symposium on Networked Systems Design and Implementation, Apr. 4, 2022, pp. 325-338.

Le, et al., "Allox: Compute allocation in hybrid clusters", In Proceedings of the 15th European Conference on Computer Systems, Apr. 17, 2020, pp. 1-16.

Li, et al., "Max-min fair resource allocation in millimetre-wave backhauls", In Journal of IEEE Transactions on Mobile Computing, May 16, 2019, pp. 1879-1895.

Liu, et al., "Traffic engineering with forward fault correction", In Proceedings of the 2014 ACM Conference on SIGCOMM, Aug. 17, 2014, pp. 527-538.

Lu, et al., "Pre-training summarization models of structured datasets for cardinality estimation", In Proceedings of the VLDB Endowment, vol. 15, Issue 3, Nov. 1, 2021, pp. 414-426.

Marcus, et al., "Neo: A learned query optimizer", Retrieved from arXiv:1904.03711v1, Apr. 7, 2019, pp. 1-18.

Mondal, et al., "A min-max fair resource allocation framework for optical x-haul and du/cu in multi-tenant o-rans", In Book of ICC 2022—IEEE International Conference on Communications, May 16, 2022, pp. 3016-3021.

Nace, et al., "Max-min fairness in multi-commodity flows", In Journal of Computers & Operations Research, vol. 35, Issue 2, Feb. 1, 2008, pp. 1-22.

Narayanan, et al., "Heterogeneity-Aware cluster scheduling policies for deep learning workload", In Proceedings of the 14th USENIX Symposium on Operating Systems Design and Implementation, Nov. 4, 2020, pp. 481-498.

Narayanan, et al., "Solving large-scale granular resource allocation problems efficiently with pop", In Proceedings of the ACM SIGOPS 28th Symposium on Operating Systems Principles, Oct. 26, 2021, pp. 521-537.

Nguyen, et al., "Approximate solutions to max-min fair and proportionally fair allocations of indivisible goods", In Proceedings of the 16th Conference on Autonomous Agents and Multi Agent Systems, May 8, 2017, pp. 262-271.

Pióro, et al., "On efficient max-min fair routing algorithms", In Proceedings of the Eighth IEEE International Symposium on Computers and Communications, Jul. 3, 2003, 8 Pages.

Radunovic, et al., "A unified framework for max-min and min-max fairness with applications", In Proceedings of IEEE/ACM Transactions on Networking, Oct. 15, 2007, pp. 1073-1083.

Ros-Giralt, et al., "A theory of convergence order of maxmin rate allocation and an optimal protocol", In Proceedings IEEE INFOCOM 2001. Conference on Computer Communications, Apr. 22, 2001, pp. 717-726.

(56) References Cited

OTHER PUBLICATIONS

Schad, et al., "Max-min fair transmit beamforming for multi-group multicasting", In Book of 2012 International ITG Workshop on Smart Antennas (WSA), Mar. 7, 2012, pp. 115-118.

Singh, et al., "Radwan: Rate adaptive wide area network", In Proceedings of the 2018 Conference of the ACM Special Interest Group on Data Communication, Aug. 7, 2018, pp. 547-560.

Xia, et al., "A social network under social distancing: Risk-Driven backbone management during COVID-19 and beyond", In Proceedings of the 18th USENIX Symposium on Networked Systems Design and Implementation, Apr. 12, 2021, pp. 217-231.

Yen, et al., "Finding the K Shortest Loopless Paths in a Network", In Journal of Management Science, vol. 15, No. 11, Jul. 1, 1971, pp. 712-716.

Zhong, et al., "Arrow: restoration-aware traffic engineering", In Proceedings of the 2021 ACM SIGCOMM 2021 Conference, Aug. 9, 2021, pp. 560-579.

Roughan, et al., "Experience in Measuring Backbone Traffic Variability: Models, Metrics, Measurements and Meaning", In Proceedings of the 2nd ACM SIGCOMM Workshop on Internet Measurment, Nov. 6, 2002, pp. 91-92.

International Search Report and Written Opinion received for PCT Application No. PCT/US2024/018570, May 22, 2024, 17 pages.

Jalaparti, et al., "Dynamic pricing and traffic engineering for timely inter-datacenter transfers," Proceedings of the 2016 ACM SIGCOMM Conference, Aug. 22, 2016, pp. 73-86.

Narayanan, et al., "Solving large-scale granular resource allocation problems efficiently with pop," Proceedings of the ACM SIGOPS 28th Symposium on Operating Systems Principles, Oct. 22, 2021, pp. 521-537.

Pal, et al., "Max-min fair distribution of modular network flows on fixed paths," International Conference on Research in Networking, May 15, 2006, pp. 916-927.

Su, et al., "Efficient algorithms for scheduling multiple bulk data transfers in inter-datacenter networks," International Journal of Communication Systems, Jul. 8, 2013, pp. 4144-4165.

* cited by examiner (a) High Load (scale factor ∈ (b) Medium Load (scale factor (c) Light Load (scale factor ∈

(64, 128)) ∈ (16, 32)) (1, 2, 4, 8))

(a) High Load (scale factor ∈ (b) Medium Load (scale factor (c) Light Load (scale factor ∈

(64, 128)) ∈ (16, 32)) (1, 2, 4, 8))

EB (a) Fairness vs Run-time (b) Efficiency wrt Danna (a) Convergence of the Adaptive Waterfilling (b) Impact of the number of bins on the fairness (c) Impact of the number of bins on the efficiency (a) Fairness vs Speed up.

(b) Efficiency (total effective rate)

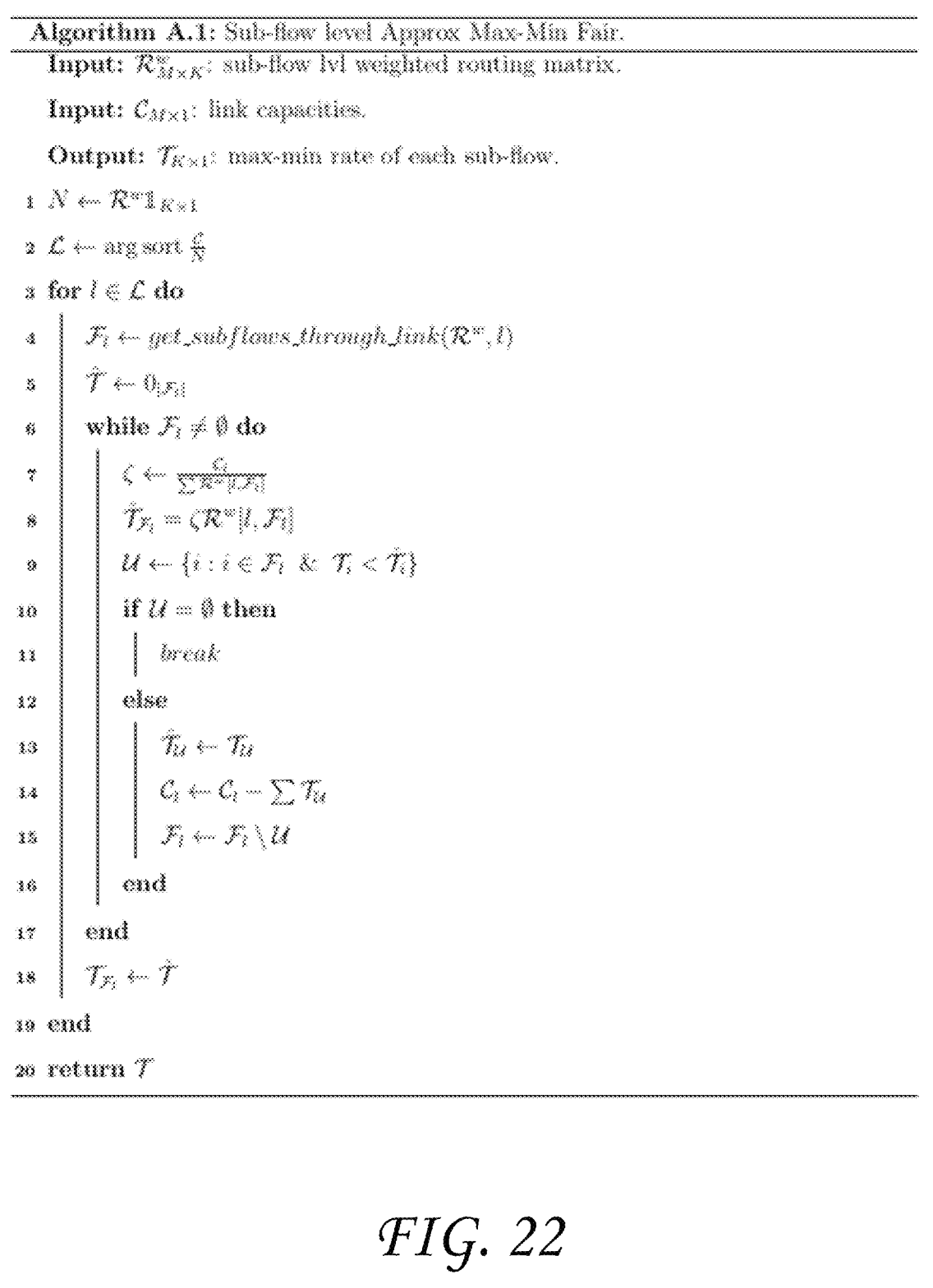

Algorithm A.1: Sub-flow level Approx Max-Min Fair.

Input: $\mathcal{R}^w_{M \times K}$: sub-flow lvl weighted routing matrix.

Input: $C_{M \times 1}$: link capacities.

Output: $\mathcal{T}_{K \times 1}$: max-min rate of each sub-flow.

1 $N \leftarrow \mathcal{R}^w \mathbf{1}_{K \times 1}$

2 $\mathcal{L} \leftarrow \arg\text{sort} \frac{C}{N}$

3 for $l \in \mathcal{L}$ do

4     $\mathcal{F}_l \leftarrow get\_subflows\_through\_link(\mathcal{R}^w, l)$

5     $\hat{\mathcal{T}} \leftarrow 0_{|\mathcal{F}_l|}$

6     while $\mathcal{F}_l \neq \emptyset$ do

7        $\zeta \leftarrow \frac{C_l}{\sum \mathcal{R}^w[l, \mathcal{F}_l]}$

8        $\hat{\mathcal{T}}_{\mathcal{F}_l} = \zeta \mathcal{R}^w[l, \mathcal{F}_l]$ 9        $\mathcal{U} \leftarrow \{i : i \in \mathcal{F}_l \ \& \ \mathcal{T}_i < \hat{\mathcal{T}}_i\}$ 10        if $\mathcal{U} = \emptyset$ then

11           *break*

12        else

13           $\hat{\mathcal{T}}_{\mathcal{U}} \leftarrow \mathcal{T}_{\mathcal{U}}$ 14           $C_l \leftarrow C_l - \sum \mathcal{T}_{\mathcal{U}}$ 15           $\mathcal{F}_l \leftarrow \mathcal{F}_l \setminus \mathcal{U}$ 16        end

17     end

18     $\mathcal{T}_{\mathcal{F}_l} \leftarrow \hat{\mathcal{T}}$

19 end

20 return $\mathcal{T}$

*FIG. 22*

SOLVING MAX-MIN FAIR RESOURCE ALLOCATION AT LARGE SCALE

CROSS REFERENCE TO RELATED APPLICATION

This application claims priority to U.S. Provisional Patent Application Ser. No. 63/488,717, filed 6 Mar. 2023, the entirety of which is hereby incorporated herein by reference for all purposes.

BACKGROUND

A modern cloud service allocates its hardware resources among a plurality of clients, typically in real time, and typically by striking a compromise among competing objectives. Such objectives may include efficiency with respect to resource utilization, which controls profitability, in addition to fairness of prioritization among clients. Generally speaking, network-resource allocation is a complex endeavor enacted via sophisticated optimization technologies. In some scenarios, the optimization technology is challenged by significant operational latency due to the complexity of the computations involved, thereby limiting the fairness of the resource allocations achievable in real time.

SUMMARY

One aspect of this disclosure relates to a method for allocating a plurality of network resources to a plurality of network-access demands of a plurality of network guests. The method comprises (a) receiving the plurality of network-access demands; (b) for each of the plurality of network-access demands (i) dynamically computing, from among the plurality of network resources, a re-sorted order of resources associated with the network-access demand, and (ii) for each network resource associated with the network-access demand, increasing, in the re-sorted order, an allocation of the network resource to the network-access demand until the network-access demand is saturated, and freezing the allocation of each of the plurality of network resources to the saturated demand; and (c) outputting the frozen allocation of each of the plurality of network resources for each of the plurality of network-access demands.

Another aspect of this disclosure relates to a network-resource allocator configured to allocate a plurality of network resources to a plurality of network-access demands of a plurality of network guests. The network-resource allocator comprises an input engine, an output engine, and a solver. The input engine is configured to furnish the plurality of network-access demands. The solver is configured to (i) receive the plurality of network-access demands from the input engine, and (ii) for each of the plurality of network-access demands, dynamically compute a re-sorted order of network resources associated with that network-access demand from among the plurality of network resources, and, for each network resource associated with the network-access demand, increase, in the re-sorted order, an allocation of the associated network resource to the network-access demand until the network-access demand is saturated, and freeze the allocation of each of the plurality of network resources to the saturated network-access demand. The output engine is configured to output each frozen allocation of each of the plurality of network resources for each of the plurality of network-access demands.

This Summary is provided to introduce in simplified form a selection of concepts that are further described in the Detailed Description. This Summary is not intended to identify key features or essential features of the claimed subject matter, nor is it intended to be used to limit the scope of the claimed subject matter. The claimed subject matter is not limited to implementations that solve any or all disadvantages noted in any part of this disclosure.

BRIEF DESCRIPTION OF THE DRAWINGS

FIG. 22 shows aspects of an example algorithm in accordance with this disclosure.

DETAILED DESCRIPTION

This disclosure presents a suite of generalizable network-resource allocators for traffic engineering and cluster scheduling, which achieve max-min fair resource allocation with high efficiency and speed. In most practical scenarios, network-resource allocators should be fast, efficient, and fair, such that one or more of these properties is traded for another to achieve a desired balance. The disclosed allocator suite includes resource-allocation algorithms that allow operators to control the trade off among speed, efficiency, and fairness metrics. Theoretical optimality-gap guarantees are proved herein for a number of the algorithms, for scenarios where operators need assurance on the worst-case performance of the system. Moreover, results show that the disclosed algorithms Pareto-dominate prior approaches, including those that are only approximately fair or trade off fairness for efficiency. Finally, sizable practical gains are demonstrated through evaluations on production traces from the wide-area network (WAN) of a large public cloud.

1. INTRODUCTION

As modern cloud infrastructure attempts to grapple with multi-tenancy, availability, and efficiency at larger scales, there is growing interest in multi-resource fair allocation problems. A multi-resource fair allocation is one in which participants (applications, user accounts, network flows) are allocated shares of multiple resources (e.g., links along a path), wherein the allocations are feasible, and each participant is allocated its fair share.

Most solutions to this problem aim to find a reasonable trade off between fairness and efficiency. The latter ensures maximum resource utilization (maximizing profit) while the former ensures that customers are treated fairly and equally, guaranteeing customer satisfaction while, in some cases, promoting network neutrality. In practical use cases, network-resource allocators are also subject to speed requirements to help maintain high utilization as loads change, and to ensure availability [Ref. 1].

While there are many notions of fairness, one commonly used is max-min fairness [Ref. 2], [Ref. 3], [Ref. 4], [Ref. 5]. In this definition of fairness, any increase in one participant's allocation results in the decrease of the allocation of some other participant with an equal or smaller allocation.

Figure 1:
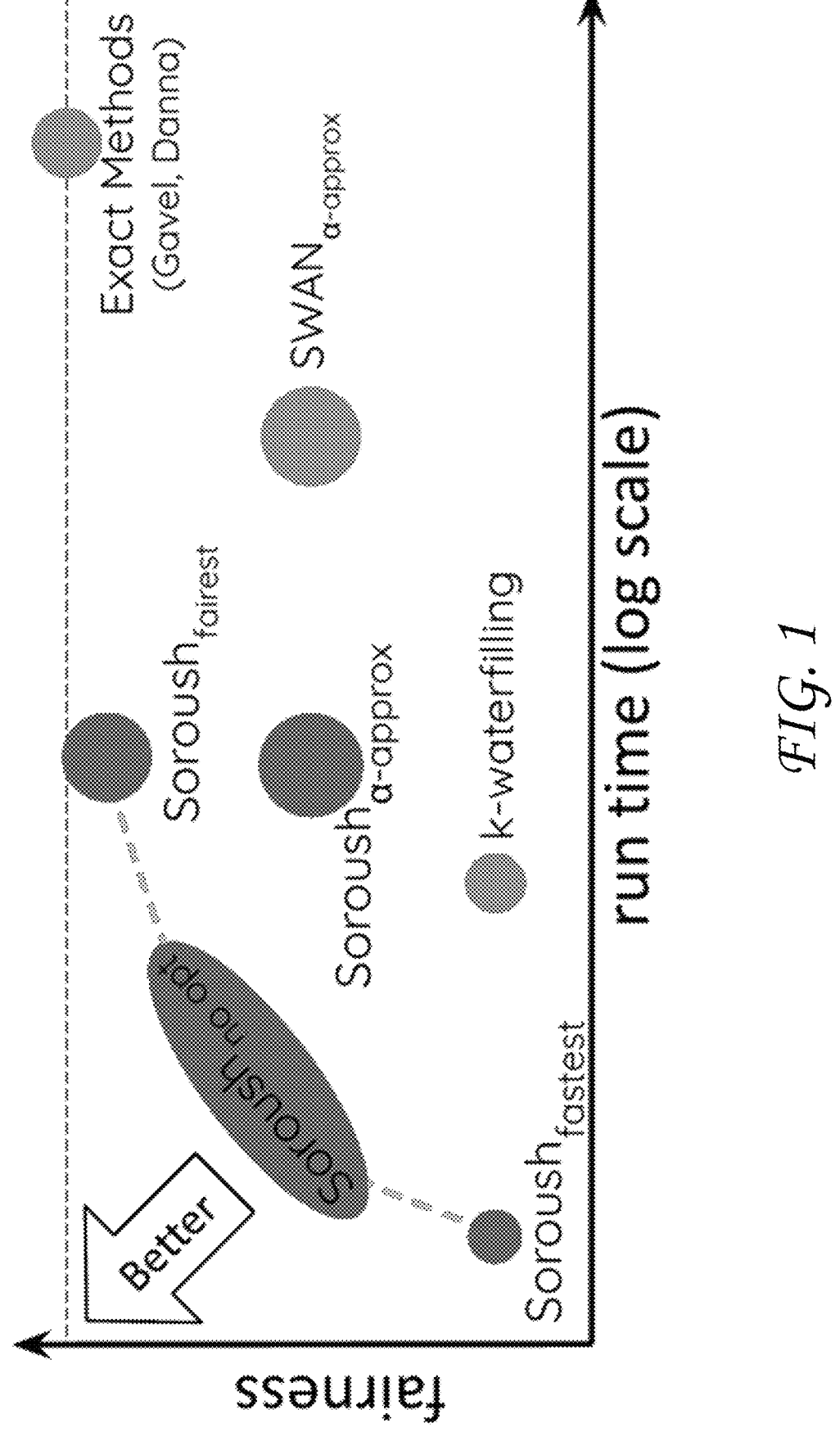
FIG. 1 shows aspects of an example trade off between fairness and run time for various network-resource allocation methods.

FIG. 1 shows the trade off space between fairness and run time. The disclosed algorithms Pareto-dominate state of the art multi-resource max-min fair allocations in both traffic Engineering (TE) and cluster scheduling (CS). The size of the markers approximates the efficiency of each method. With reference to the solver implementations defined hereinafter, the fairest solver is the equi-depth binner (EB) and the fastest is the approximate waterfiller. Other solvers include the adaptive waterfiller and the geometric binner (GB).

Recent work has focused on multi-resource max-min fair allocations in cloud settings: WAN traffic engineering [Ref. 5], [Ref. 4], [Ref. 3], [Ref. 6] and scheduling of CPU and GPU resources in clusters [Ref. 7], [Ref. 8], [Ref. 2]. The scale of these problems is large: WANs have hundreds of routers, and each cluster may schedule thousands of jobs. At this scale, existing (general) exact solutions tend to be too slow. Indeed, even recent work which speeds up these solutions using domain knowledge [Ref. 5], [Ref. 2] can sometimes take tens of minutes to hours (Section 4).

Operators invoke network-resource allocators whenever a failure occurs or the workload changes, and, therefore, existing solutions are no longer ideal for production use. Recent approaches have focused on trading off efficiency or fairness for increased speed. To date, prior work has explored approximations [Ref. 4], [Ref. 3] for each of these settings independently.

This disclosure makes three contributions. First, it recognizes that many resource allocation problems are instances of the same formulation (Section 2.1). Through this observation it develops a unified framework for expressing allocation problems (Section 2) in traffic engineering (TE) and cluster scheduling (CS) Both of these problems have similar demand, capacity, and feasibility constraints as well as dependencies between resources—e.g., links on a path, or CPU and GPU resources on a server—and one can express them as graph-based multi-commodity flow problems with fairness constraints. While it was already known that TE may be formulated in this manner, it is shown here that CS can also be expressed like this (Section 2).

Second, this disclosure shows how to achieve optimal max-min fair allocations by solving a single convex optimization (Section 3.1) for small enough E. The design of the optimization is based on the following insight. A provably correct approach to solving max-min fair allocations is 'waterfilling' [Ref. 9]—allocating resources until one demand saturates, fixing the capacity allocation for saturated demands, and repeating the process until all demands are saturated. Waterfilling applies only to a single-resource setting [Ref. 10]. For multi-resource allocation, existing (approximate) approaches invoke at least one optimization to allocate subsets of demands at each step of this process [Ref. 11], [Ref. 12], which negatively impacts their run time. To eliminate such iterations, a formulation is used herein that includes dynamically identifying the sorted order of rate allocations across demands as part of the main optimization. The single-shot optimization formulation uses a sorting network [Ref. 13] to find a sorted order of rate allocation across demands, which allows the optimization to prioritize demands in the correct order and to find the optimal max-min fair rates.

Third, this disclosure presents a suite of fast, multi-resource exact and approximate max-min fair formulations, which allow operators to specify the trade off that they would like to achieve among fairness, efficiency, and speed. Each formulation includes the single-shot convex optimization solution but also builds on its core idea to develop approximations that provide different trade offs (with various theoretical guarantees). By obtaining good estimates of the rate allocation order one can achieve faster single shot solutions. Further, the requirement for exact fairness between flows with similar rates can be relaxed to achieve more efficient and yet fast solutions.

In accordance with this insight, four different allocators are developed, which estimate allocation orders in different ways and possess distinct properties (Section 3).

The 'geometric binner' (GB) rank orders flows by binning them into geometrically increasing bin sizes. GB is moderately fast, provides reasonable fairness and efficiency, and theoretically guarantees worst-case bounds on per-flow fairness. The 'approximate waterfiller' divides flows into sub-flows and runs a fast, approximate, waterfilling algorithm. the approximate waterfiller is the fastest of the approaches investigated, but has lower fairness and efficiency relative to other techniques. The 'adaptive waterfiller' iteratively applies a weighted version of approximate waterfilling to more fairly apportion rates to sub-flows. The adaptive waterfiller is faster, fairer, and more efficient than GB, and always converges to a space of solutions guaranteed to contain the optimal solution. The 'equi-depth binner' (EB) uses rate estimates from the adaptive waterfiller to search for bin boundaries that give fairer solutions. It is as fast as GB, but provides no guarantees.

Several of these estimators have parameters that further control the trade off among speed, fairness, and efficiency. These algorithms are instantiated in a suite of network-resource allocators, which can select an appropriate formulation (and its associated parameters) based on the operator's specification of the trade offs they desire, as well as whether they require theoretical guarantees.

FIG. 1 captures the speed and fairness of the different disclosed formulations and shows their qualitative relationship to the state-of-the-art. These relationships also hold quantitatively (Section 4). These approaches provide either order-of-magnitude speed-ups or significantly higher fairness and efficiency, or both, over conventional SWAN [Ref. 4] for TE and Gavel [Ref. 2] for CS. As disclosed herein, GB has been integrated with a production TE solver at a large cloud provider. Results on traces from production indicate a speed-up of three to four times in the computation of max-min fair rates.

2. MOTIVATION AND OVERALL APPROACH

Figure 2:
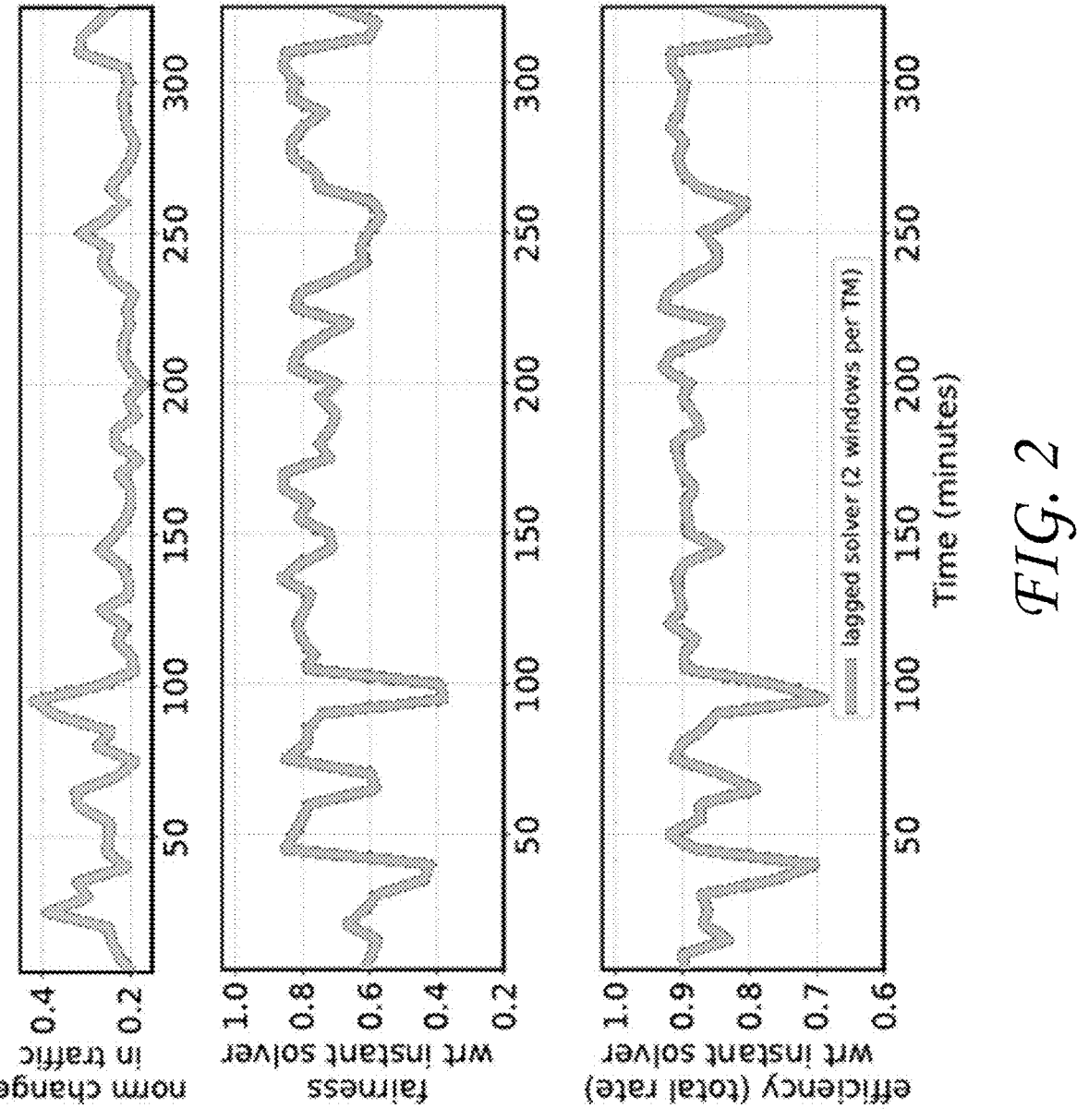
FIG. 2 illustrates, by way of example, that slower max-min fair network-resource allocators lead to under-utilization and unfairness.

FIG. 2 shows that slow max-min fair network-resource allocators lead to under-utilization and unfairness. Results are based on a 5 hour trace from a production WAN.

The need for fast TE has become evident with increasingly faster workload dynamics and higher availability requirements. Prior work [Ref. 1] shows that WAN traffic significantly changes over short time scales. While fast solvers that optimize only for efficiency [Ref. 1], [Ref. 14], [Ref. 15], [Ref. 16] exist and adapt to such changes, operators require a solution that provides fairness, especially in multi-tenant cloud systems. More importantly, they want to be able to balance these two objectives [Ref. 4], [Ref. 3].

Solvers that meet these requirements [Ref. 4], [Ref. 5] are too slow and cannot adapt to frequently changing network conditions. Today, some providers address this as follows [Ref. 1]: if a solver is slow and can not finish the computation within a fixed window, the TE pipeline uses the most recent available allocation from previous windows. Using previous allocations is problematic because some nodes may increase their demand in the new epoch and, therefore, not get enough resources. In contrast, others who request less receive more than they need.

Figure 3:
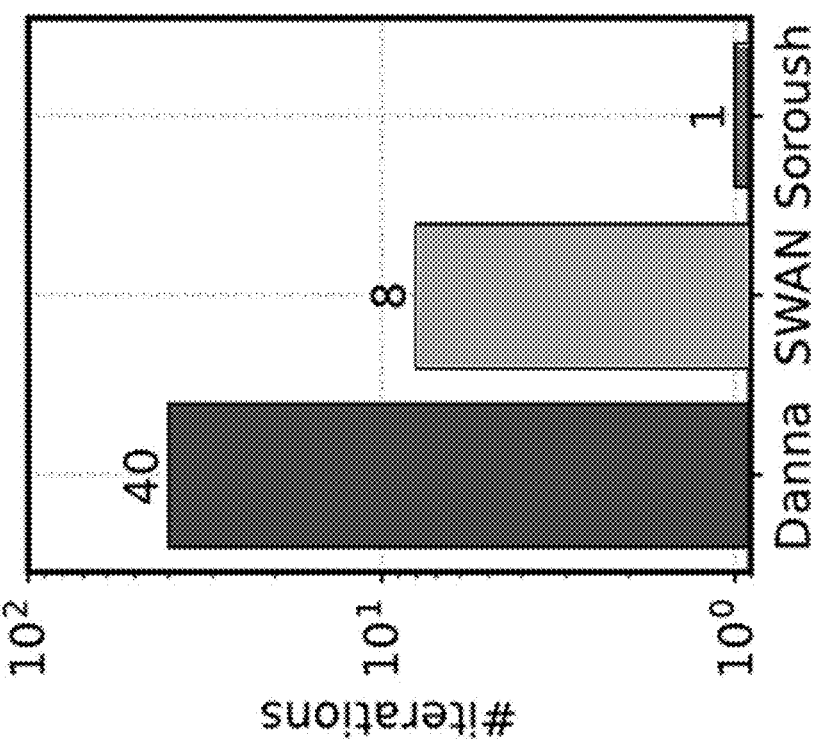
FIG. 3 compares the ability of state-of-the-art network-resource allocation methods to keep up with changing demands (left) and the number of iterations needed to do so (right).
Figure 3:
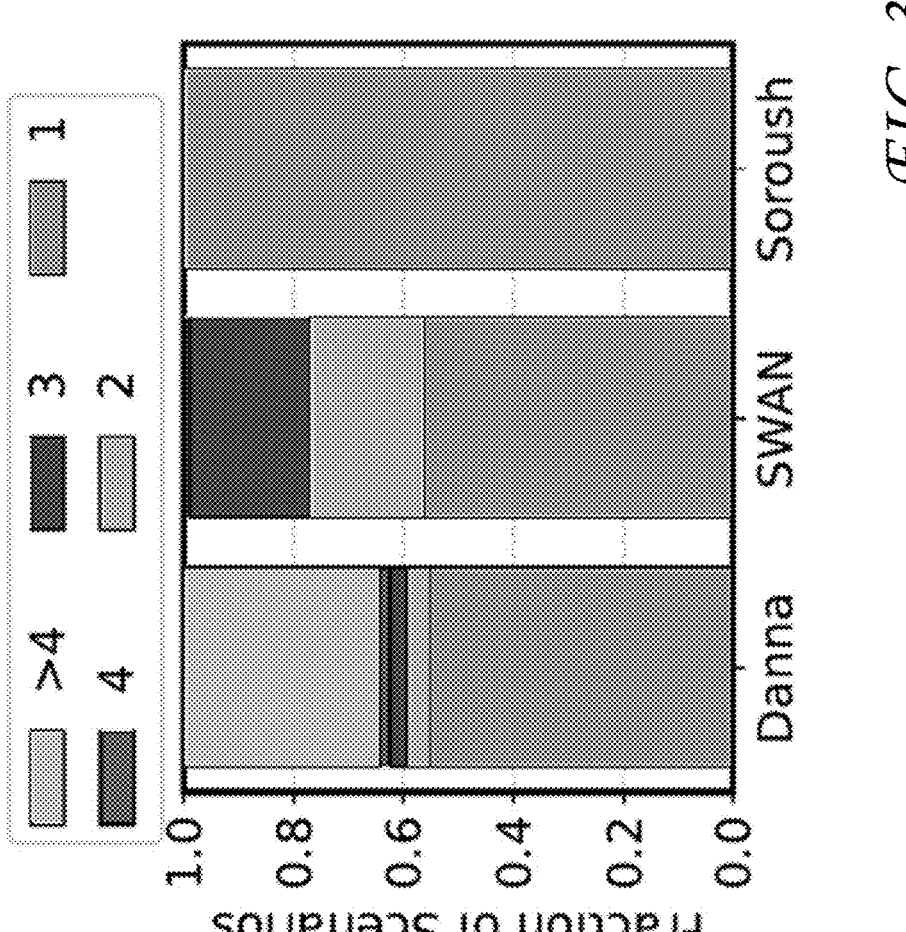

FIG. 3 shows the ability of state-of-the-art methods to keep up with changing demands (left) and the number of iterations needed to do so (right). The number of windows each approach needs (left) are captured; to keep up with demands, they must finish within a single 5-minute window. Both use a topology with ~200 nodes and ~500 edges. Left captures 160 different scenarios. Right is a highly loaded scenario [Ref. 1]. The results on the left figure hold across all the algorithms here disclosed.

In FIG. 2, the impact of this strategy is quantified using a 5-hour trace from a production WAN, which uses a 5-minute window. It is observed that a solver that needs two windows (10 minutes) for computing the allocation faces a 20 to 60% reduction in fairness and a 10 to 30% reduction in efficiency relative to a solver that completes within one window. The reduction is higher at points where traffic changes significantly.

How often do solvers not complete in time? In FIG. 3 are shown, using traces from [Ref. 1], the distribution of the number of windows needed to compute max-min fair allocations by an exact solver (Danna et al. [Ref. 5]) and by an approximate solver deployed in a large cloud's WAN (SWAN [Ref. 4]). For nearly half of the traffic trace, these solvers exceed the allotted 5-minute window, often requiring two to three windows of computation to finish (FIG. 3, left). This is because these approaches invoke expensive optimizations multiple times (FIG. 3, right). The solutions herein invoke a single optimization and always completes within a single window.

Similar arguments can be made for fast solvers for CS: fast cluster schedulers are critical for accelerating ML training at scale [Ref. 2].

2.1. Unified Approach

The inventors herein have observed that TE and CS resource allocation problems are instances of the same multi-resource max-min fair optimization. Fast solvers can be developed that apply to both. The reader is directed to appendix Section 8 for the details of this general max-min fair resource allocation formulation. Here the focus is on describing the constraints and objectives for these problems to show how optimizations that apply to one can apply to the others.

2.1.1. Base Constraints

Common to both problems are two sets of constraints: demand constraints and capacity constraints (Equation 1). These constraints capture restrictions on the amount of resources needed to allocate to each demand. The constraints are nonnegative and upper-bounded by what the demand is asking for, also ensuring that resources are not over-allocated beyond the available capacity. TE and CS have these constraints in common but differ in either the objective they optimize or in additional constraints they impose on the problem.

TABLE 1

Multi-commodity flow problem notation. The corresponding analogy for CS appears in parentheses. Certain variables only apply to CS, also in parenthesis.

| Term | Meaning |
|---|---|
| $\mathcal{V}, \mathcal{E}, \mathcal{D}, \mathcal{P}$ | sets of nodes (jobs), edges (GPUs), demands (resource-requests), and paths (pre-defined, single-edge, paths representing whether a job is runable on a given GPU) |
| N, M, K, P | number of nodes, edges, and demands and paths $N = \mid \mathcal{V} \mid, M = \mid \mathcal{E} \mid, K = \mid \mathcal{D} \mid, P = \mid \mathcal{P} \mid$ |
| $c_e$, p | $c_e$: capacity of edge $e \in \mathcal{E}$ (resources available on GPU $e \in \mathcal{E}$) path p: set of connected edges (single-edge: show which job can use which GPU) |
| $d_k$ | the kth element in $\mathcal{D}$ has a non-negative volume ($d_k$) |
| f, $f_k^p$ | f: flow assignment vector with elements $f_k$ (job assignment vector) $f_k^p$: flow for demand k on path p (resource allocated to job k on GPU using path p) |
| $r_k$ | (capacity usage, per unit resource, of job k) |

7

TABLE 2

| Additional notation. |
| --- |

$$\text{FeasibleAlloc}(\mathcal{V}, \mathcal{E}, \mathcal{D}, \mathcal{P}) \triangleq \{f \mid$$

$$f_k = \sum_{p \in \mathcal{P}_k} f_k^p, \quad \forall k \in \mathcal{D} \text{ (allocation for demand k)} \tag{1}$$

$$f_k = \le d_k, \quad \forall k \in \mathcal{D} \text{ (allocation below volume)}$$

$$\sum_{k,p \mid p \in \mathcal{P}_k, e \in p} r_k f_k^p \le c_e, \quad \forall e \in \mathcal{E} \text{ (allocation below capacity)}$$

$$f_k^p \ge 0 \quad \forall k \in \mathcal{P}, k \in \mathcal{D} \text{ (non-negative allocation) }\}$$

| Term | Meaning |
| --- | --- |
| $t, t_i$ | sorted rate assignment vector where $t_i$ is the i-th smallest rate |
| $N_\beta, \mathcal{D}_b$ | $N_\beta$: number of bins $\mathcal{D}_b$: set of demands in bin b |
| $1, 1_b, s_b$ | 1: bin boundary vector with elements $1_b$ $s_b$: slackness for upper limit of bin b |
| $f_{kb}$ | rate of demand k in bin b |

2.1.2. TE

TE routes traffic in a way that respects capacity constraints, meets customer demands as much as possible, and optimizes for various additional objectives such as resilience to failure [Ref. 17], [Ref. 14], fairness [Ref. 4], [Ref. 3], [Ref. 6], or overall network utilization [Ref. 1]. The fairness objective can be modeled as:

$$OptTE(\mathcal{V}, \mathcal{E}, \mathcal{D}, \mathcal{P}) \triangleq \text{fair}(f) \tag{2}$$
$$\text{s.t. } f \in FeasibleAlloc(\mathcal{V}, \mathcal{E}, \mathcal{D}, \mathcal{P}),$$

where fair(f) is the max-min fair objective. Closed but non-convex forms of this function are presented hereinafter in Section 9.

2.1.3. CS

CS splits computation resources (e.g., CPUs, GPUs) among jobs. Fairness is a common objective in CS [Ref. 2], [Ref. 18]. Jobs are heterogeneous—e.g., job A, unlike job B, may perform poorly on a GPU. Therefore, CS schedulers have to contend with additional constraints on the resource allocation problem. Recent work [Ref. 2] suggests a heterogeneity-aware version of the CS scheduling policy:

$$OptCS(\mathcal{V}, \mathcal{E}, \mathcal{D}, \mathcal{P}) \triangleq \text{fair}\left(\text{diag}\left(W \cdot F^T\right)\right) \tag{3}$$
$$\text{s.t. } f \in FeasibleAlloc(\mathcal{V}, \mathcal{E}, \mathcal{D}, \mathcal{P}),$$

where W is the K×P weight matrix whose entries $w_{kp}$ are the normalized throughput of the k-th job on resource p and $\mathcal{F}$ is the per-job resource allocation matrix (diag(X) returns the diagonal of matrix X).

2.1.4. Formulation Summary

The formulations of these two problems can be refactored to extract common constraints Section 8, thereby enabling a unitary solution. Many other resource allocation problems fit into this framework—e.g., [Ref. 19], [Ref. 20], and [Ref. 18], among others).

8

2.2. Network-Resource Allocator Suite Overview

Each of the disclosed suite of network-resource allocators provide approximate solutions for graph-based[1] multi-resource max-min fair allocation problems. An allocator is either an algorithm or an optimization, or a combination of the two, that produces rate allocations consistent with the demand and capacity constraints and approximately consistent with the objectives from the underlying TE, CS, or max-min fair formulations. The allocator suite helps with allocator selection. Operators input:

1. Demand, capacity and feasibility constraints (Section 2.1) for their problem (TE, CS, or other). The allocator suite includes pre-defined constraints for TE and CS. The allocator suite is modular, so users can easily add new sets of constraints for other problems.
2. Goals for speed, fairness and efficiency, and whether they require worst-case fairness guarantees.
3. Problem inputs—e.g., traffic demands for TE or job arrivals for CS—for which they need to run resource allocation.

[1]Not all resource allocation problems can be formulated as graphs [Ref. 21].

Figure 5:
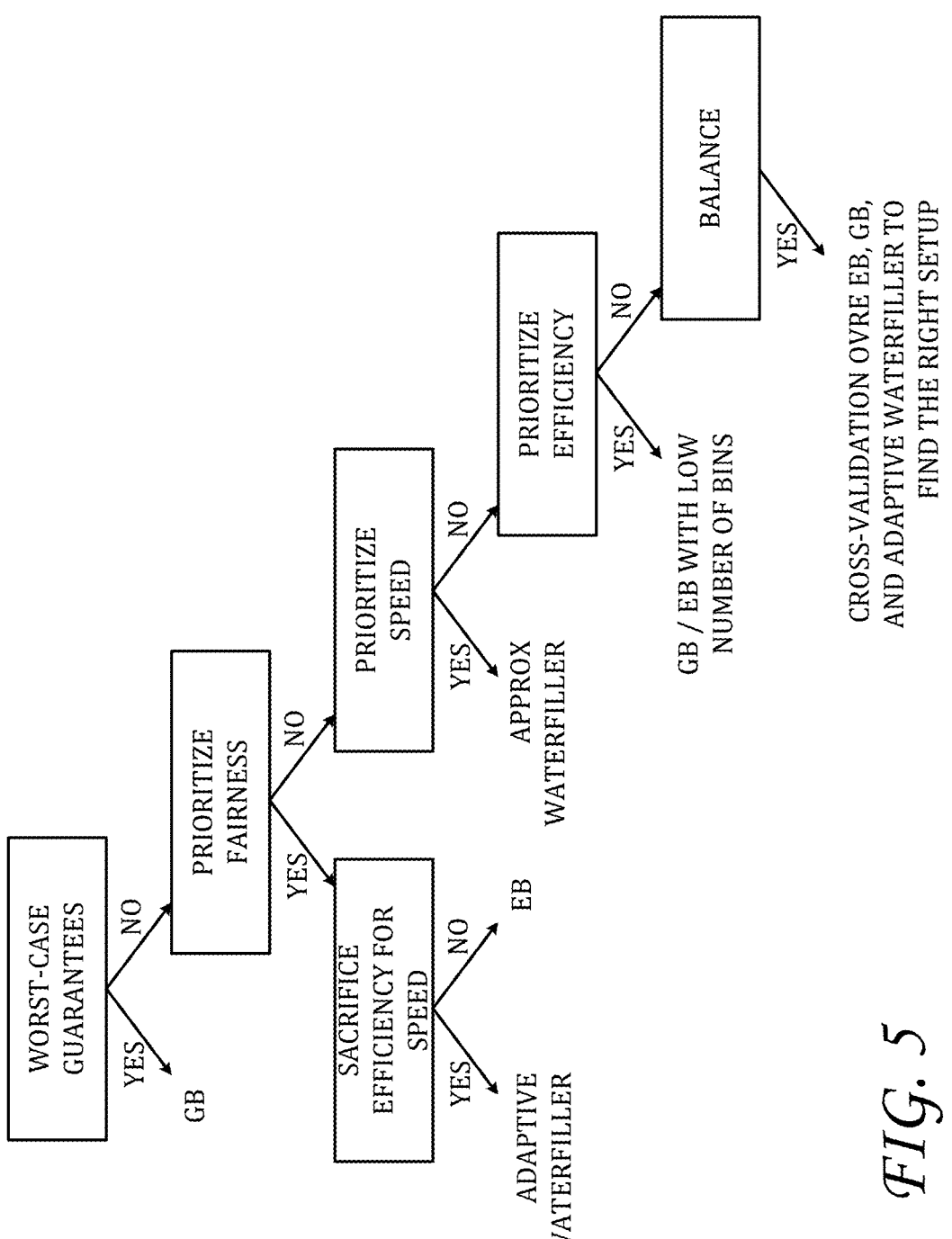
FIG. 5 shows aspects of an example process to find in the allocator suite of FIG. 4 an algorithm that matches the user's priorities.

As shown in FIG. 5, the disclosed suite of network-resource allocators can decide which allocator to use and with what parameters, in order to meet the operator's goals. The operators can invoke either the selected allocator or any other in their TE pipeline or cluster scheduler. (Section 4) The disclosed allocators are robust to changes in topology and workload.

Figure 4:
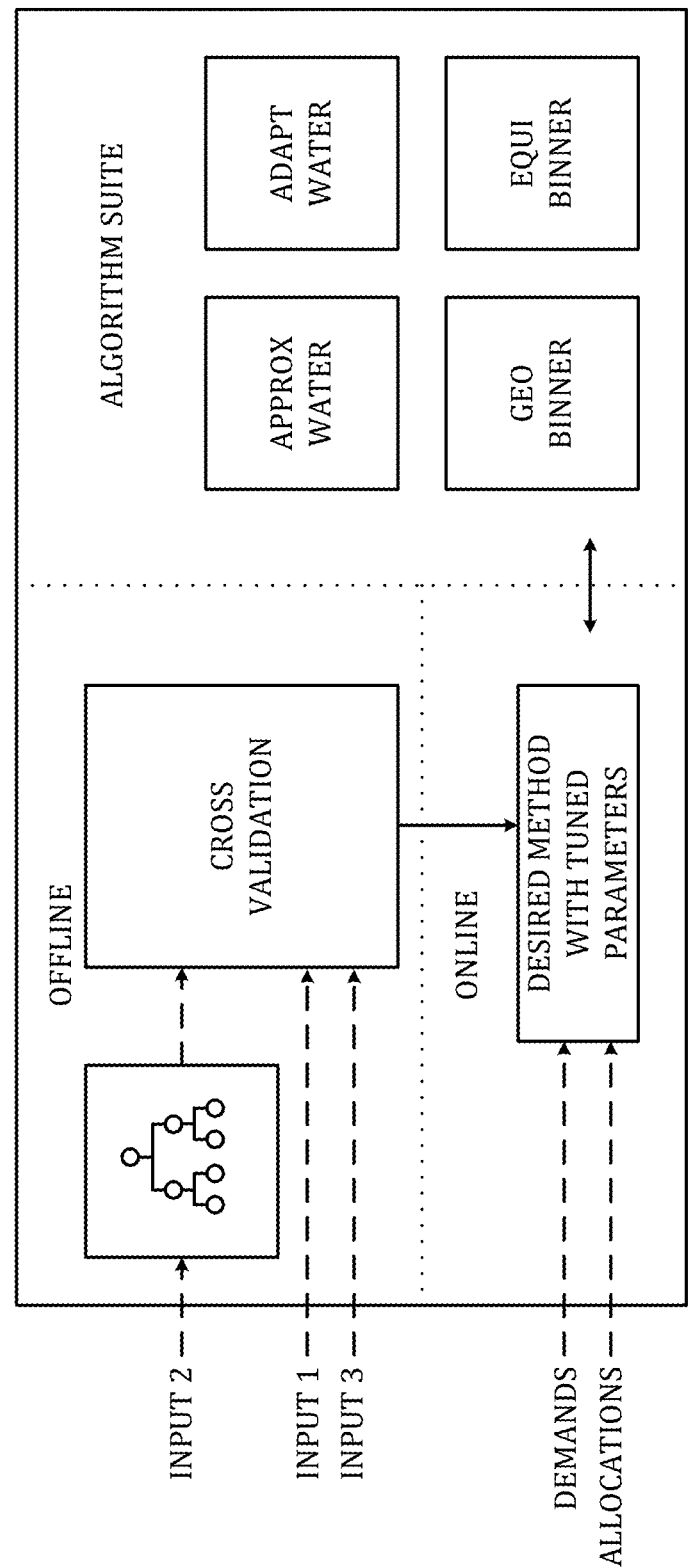
FIG. 4 provides an example overview of a network-resource allocator suite in accordance with this disclosure.

FIG. 4 provides an example overview of the disclosed suite of network-resource allocators. FIG. 5 shows aspects of an example decision process to find the algorithm that matches the user's priorities. In some examples cross-validation is used to find the most suitable set of parameters.

3. NETWORK-RESOURCE ALLOCATOR SUITE

Existing exact [Ref. 5] or approximate [Ref. 4] formulations for multi-resource max-min allocations are slow. At their core, many are based on the idea of waterfilling [Ref. 9] which allocates demands until one demand saturates, fixing the capacity allocation for saturated demands, and repeating the process until all demands saturate or all resources are allocated. For the multi-resource max-min problem, each step of demand allocation until one demand saturates requires solving an expensive optimization, resulting in slow overall solution times.

At the core of the allocator suite is the observation that multi-resource max-min fair allocation problems, when formulated as a multi-commodity flow problem with fairness constraints, can be solved using a single-shot optimization. This feature, discussed next, motivates the design of several other allocators described subsequently.

3.1. Single-Shot Optimization

The single-shot optimization algorithm of each allocator provides an exact formulation and a corresponding tight approximation of the max-min fair resource allocation problem. The following intuition is applied: if the rank order of rates needed for each flow were known, then one could focus on maximizing the smallest first, then move on to the second smallest, and so on. It follows from the following definition of max-min fairness that this allocation would be max-min fair.

Definition 1. A bounded allocation is 'max-min fair' if it is feasible and all attempts to increase the allocation of any participant result in the decrease in the allocation of some other participant having an equal or smaller allocation.

However, since this ordering is unknown a priori, a formulation is needed that allows dynamic discovery as part of the resource allocation solution. This idea is used to help write an optimal formulation of the multi-path max-min fair resource allocation problem[2] which are then reformulated to a single-shot, approximate form. The idea is to allow for a sequential optimization of flow-rate allocations, where in the $i^{th}$-round, the rate allocation is maximized for the $i^{th}$ smallest flow, as follows:

$$MaxMinAlloc_{i+1}(\mathcal{V}, \mathcal{E}, \mathcal{D}, \mathcal{P}) \triangleq \quad (4)$$

$$\arg\max_{t_1,\dots,t_{i+1}} t_{i+1}$$

$$\text{s.t. } f \in FeasibleFlow(\mathcal{V}, \mathcal{E}, \mathcal{D}, \mathcal{P}),$$

$$t_{i+1} = (i+1)\text{-}th \text{ smallest rate}(f),$$

$$(t_1,\dots,t_i) \in MaxMinAlloc_i(\mathcal{V}, \mathcal{E}, \mathcal{D}, \mathcal{P}).$$

Sorting networks [Ref. 13] are used to dynamically discover the ordering across flows ($t_{i+1}=(i+1)$-th smallest rate (f)). Sorting networks allow encoding of the rate-oblivious sorting problem as an optimization; using sorting networks (FIG. 6) to encode the globally optimal max-min fair problem is believed to be novel. Unfortunately, the above formulation, although exact, belongs to a family of optimizations called multi-level optimization which are non-convex and slow to converge [Ref. 22]. The problem is reformulated such that, through the objective, the optimization is incentivized to prioritize maximizing the smallest flow, then the second smallest, and so on:

[2]The intuition behind this formulation allows other variations of this single-shot optimization as well which provide alternative trade offs.

$$OptMaxMinAlloc(\mathcal{V}, \mathcal{E}, \mathcal{D}, \mathcal{P}) \triangleq \quad (5)$$

$$\arg\max_{f} \sum_{i=1}^{n} \epsilon^i t_i$$

$$\text{s.t. } f \in FeasibleFlow(\mathcal{V}, \mathcal{E}, \mathcal{D}, \mathcal{P}),$$

$$(t_1,\dots,t_n) = \text{sorted rates}(f)$$

where n is the number of demands. The $\epsilon$ weights in Eq 5 encode the incentive structure ($\epsilon \leq 1$). The optimization gets higher payoff for respecting the correct order in maximizing the resources it allocates to each flow—maximizing the smallest flow with weight $\epsilon$, then the second smallest with weight $\epsilon^2$, and so on. This formulation is faster, but its optimality depends on the choice of $\epsilon$. Indeed, the following can be proved:

Theorem 1. There exists an $\epsilon$ for which the Eq 5 optimization yields optimal, max-min fair rate allocations. Indeed, for $\epsilon \to 0$ the gap between the solutions of Eq 4 and Eq 5 goes to zero.

The full proof of Theorem 1 is provided in Section 10.1. It follows from the fact that the solution t* to Eq 4 is either optimal in Eq 5 for a given $\epsilon$ or $$\sum_{i=1}^{n} \epsilon^i t_i^* < \sum_{i=1}^{n} \epsilon^i t_i$$

where $t_i$ is the optimal solution to Eq 5. Using this, the gap between t* and t is shown to approach zero as $\epsilon \to 0$.

This approximate multi-path max-min fair allocator is still relatively slow—having $O(n \log^2(n))$ additional constraints, where n is the number of demands—relative to other allocators discussed below. It may be hard to tune due to the sensitivity to the choice of $\epsilon$. Hence, each of the disclosed allocators uses the underlying intuition—e.g., rank-ordering flows and solving a single optimization problem—to develop faster, more efficient, allocators.

Figure 6:
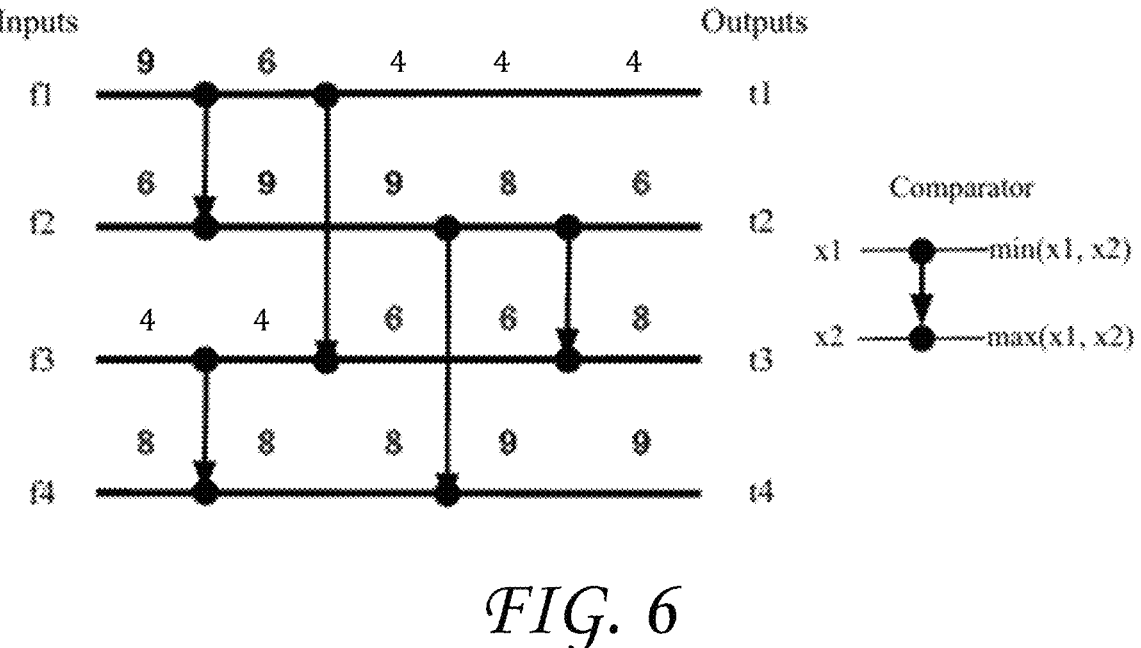
FIG. 6 shows aspects of a sorting network in one, non-limiting example.

FIG. 6 provides a non-limiting example of a sorting network.

3.2. Geometric Binner

The next allocator, the geometric binner, like SWAN [Ref. 4], achieves $\alpha$-approximate fair rates but is much faster—unlike SWAN it computes the rate allocation in one-shot.

Figure 7:
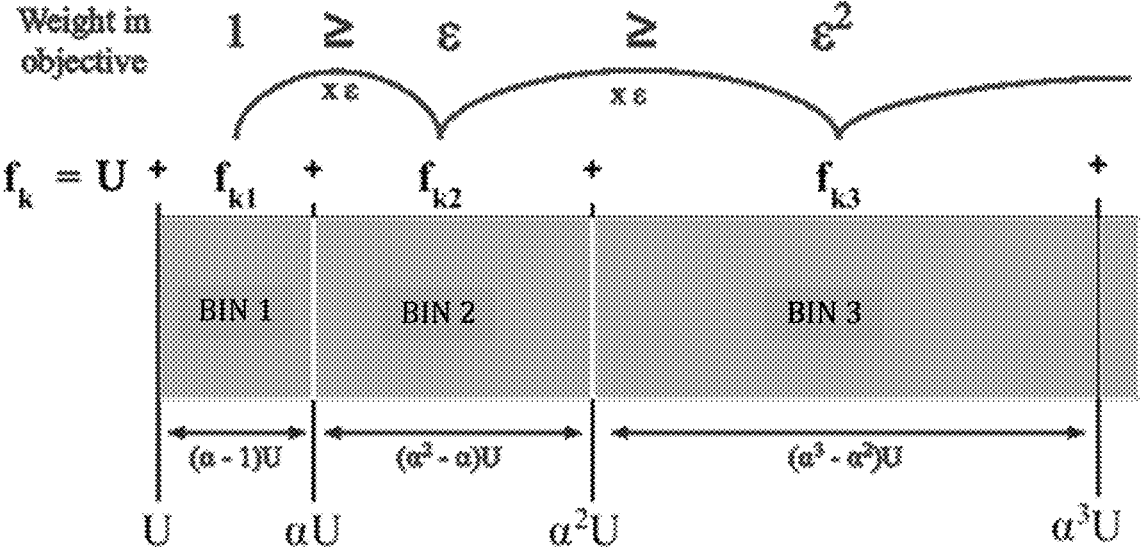
FIG. 7 shows aspects of geometric binning (GB) in one, non-limiting example.

Informally, the idea behind the geometric binner (GB) is to loosen the requirement for perfect max-min fair resource allocation by generating an approximate rank-ordering of flows. This reduces the complexity of the problem by enforcing fairness across fewer flows while controlling the degree of unfairness it allows. It achieves this by dividing the range of possible rate assignments into bins (FIG. 7). It assigns to a flow f rates that fall in a higher bin only if f has already been assigned the full rate from all smaller bins and all other flows do not need the rate from lower bins. This permits flow-rate assignment to grow in parallel, but only ensures max-min fair allocations across flows that fall in different bins; flows within a bin need not satisfy the max-min fair requirement. This approach is conceptually similar to the idea in SWAN, except that it can be generalized to support any binning strategy, and only requires solving a single optimization.

To be able to solve as a single optimization, one could naively implement this idea using binary (indicator) variables to encode whether a given flow's rate assignment falls into a particular bin. This would result in a mixed-integer linear program which is slow [Ref. 23]. However, it is possible to build on the idea of this formulation in Eq 5 to encode it as an LP. Per-flow, per-bin, real-valued variables are used to track the resource amount allocated to each flow in each bin, and incentivize the optimization to allocate rates in the correct order of bins through bin-level $\epsilon$ weighting from Section 3.1. Formally:

$$GeoBinning(\mathcal{V}, \mathcal{E}, \mathcal{D}, \mathcal{P}) \triangleq \quad (6)$$

$$\arg\max_{f} \sum_{k \in \mathcal{D}} \sum_{b=1}^{N_\beta} \epsilon^{b-1} f_{kb}$$

$$\text{s.t. } f_k = \mathcal{U} + \sum_{b=1}^{N_\beta} f_{kb} \; \forall k \in \mathcal{D}$$

$$f_{kb} \leq (\alpha^b - \alpha^{b-1})\mathcal{U} \; \forall k \in \mathcal{D} \; \& \; \forall b \in \{1 \dots N_\beta\}$$

$$f \in FeasibleFlow(\mathcal{V}, \mathcal{E}, \mathcal{D}, \mathcal{P}),$$

where $N_\beta$ is the number of bins and $f_{kb}$ shows the variable for the $k^{th}$ flow in the $b^{th}$ bin. U and $\alpha > 1$ are inputs to the optimization and determine the boundaries between bins (see FIG. 7). Because bin widths increase geometrically, this allocator is called the geometric binner.

Worst-case bounds are provided for its rate allocation:

Theorem 2. The optimization Eq 6 produces $\alpha$-approximate max-min fair rates: the rate allocations $f_i$ are in the interval $$\left[\frac{t_i^*}{\alpha}, \alpha t_i^*\right],$$

where $$t_i^*$$

are optimal max-min fair rates.

Theorem 2 is proved using the same technique that shows the $\alpha$-approximate result for the iterative approximate max-min fair algorithm in SWAN [Ref. 4]. To avoid redundancy, the proof [Ref. 4] is omitted.

Figure 8:
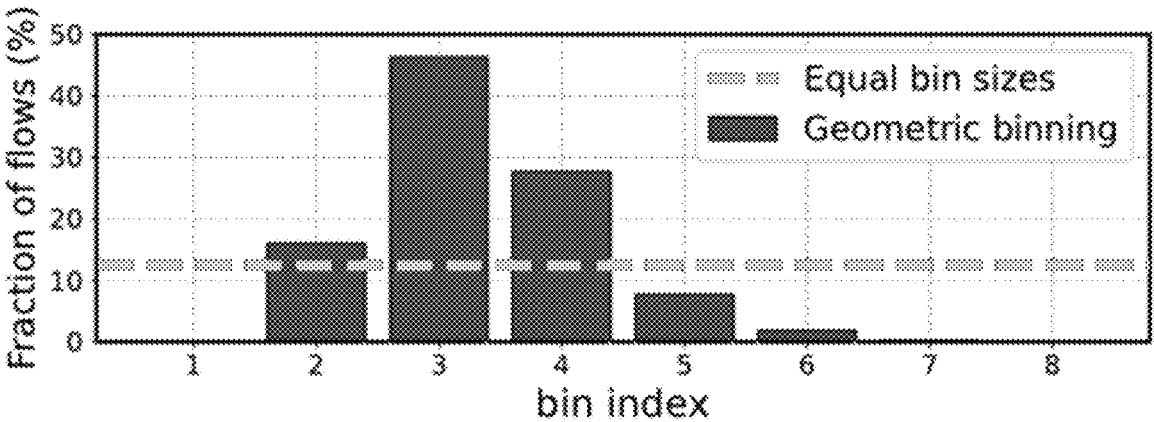
FIG. 8 shows aspects of imbalanced bins in GB, in a non-limiting TE use case.

GB is substantially faster than the optimal max-min fair network-resource allocator by Danna et al [Ref. 5], the SWAN approximate solution [Ref. 4], and the approximate form in Section 3.1 (Section 4). However, GB may result in significant imbalance across bins and many flows may end up in a single bin (FIG. 8). This can result in increased unfairness as all the flow variables of a specific bin have the same rewards (i.e., weights in the objective). It is difficult to overcome the bin imbalance problem through this approximate formulation alone, so other allocators are explored. GB is still useful for settings that require worst-case bounds on max-min fair rate allocations and is the algorithm integrated into the production solver.

FIG. 7 provides a non-limiting example of geometric binning. FIG. 8 provides a non-limiting example of imbalanced bins in GB in a TE usecase.

3.3. Approximate Waterfiller

The geometric binner essentially lets the optimization solver find a partial (or binned) order of flows, which enables a single-shot optimization. It is possible to improve upon this by finding not just a rank-order of flows, but also an approximate allocation of rates to flows. One may use such an allocator as a standalone solution, or use its outputs as inputs to a binner (Section 3.5).

Described next is the approximate waterfiller, which provides no guarantees but is the fastest of the disclosed allocators. It builds upon the classical waterfilling[3] algorithm for finding max-min fair rates for single-path flows and works as follows:

1. To each link with capacity C, assign a link fair-share C/N, where N is the number of flows traversing the link.
2. On the link with the smallest link fair-share, freeze the rate of all flows traversing that link at the link fair-share.
3. Using these values update the capacity of the links, and recompute link fair-shares as described in step 1.
4. Repeat step 2 until the rates of all flows are frozen.

[3] Other work [Ref. 24] has proposed ways to parallelize waterfilling by freezing flows on multiple links in parallel if the links do not share flows. It is shown that the network-resource allocators herein outperform the most parallel version of waterfilling in Section 4.

The algorithm above can be simplified by retaining the ordering of the links from step 1 in subsequent steps. At each step, however, it recomputes the link fair share for the link under consideration, and fixes flow rates for the flows bottlenecked by that link. The approximate-waterfiller herein extends this approach to the multi-path case by treating each path as a separate sub-flow and applies the same algorithm. The aggregate rate assigned to flows is ensured to not exceed the demand by routing all of a flow's subflows through a virtual edge whose capacity is equal to the flow's demand (FIG. 22).

While waterfilling is optimal for the single-path setting, approximate waterfiller does not provide any fairness or efficiency guarantees because of the relaxations noted above. However, it always produces a feasible allocation (because it respects capacity and demand constraints), is fast, and has good empirical fairness and efficiency properties (Section 4). It can be useful for computing approximate max-min fair rates in some settings, such as for assessing the risk for capacity planning strategies as in [Ref. 25].

3.4. Adaptive Waterfiller

The approximate waterfiller ensures fairness at a sub-flow level but not at the flow-level. For instance, the path of two sub-flows for an individual flow may go over the same bottleneck link resulting in the flow getting more than its fair share. To address this issue, a weighted version of waterfilling may be used to iteratively search for weights assigned to each sub-flow of a flow. A rate allocation f is weighted max-min fair if, for each flow $f_i$ that is bottlenecked on some link l, $$\frac{f_i}{w_i} \geq \frac{f_j}{w_j}$$

for all $f_j$ that also go through that link.

The 'adaptive waterfiller' uses the weights in weighted waterfilling to rectify the flow-level unfairness. Using the approximate waterfiller (Section 3.3) as a basis, the adaptive waterfiller computes an initial set of flow assignments for each subflow and uses these to iteratively update the set of weights. Specifically, the weight of each subflow j of flow i at iteration t+1 is assigned as $$w_{ij}(t+1) = \frac{f_{ij}(t)}{\sum_j f_{ij}(t)},$$

where $f_{ij}(t)$ is the solution of the weighted waterfilling at iteration t. The algorithm converges once $w_{ij}(t+1)=w_{ij}(t)$. Tuning these weights allows the multi-path algorithm to converge to better flow-level fair allocations. To make this more precise, the notion of bandwidth bottleneck is defined. A flow $f_i$ is bandwidth bottlenecked in the multi-path setting if: (i) Each of its subflows $f_{ij}$ is bottlenecked on some link l, and (ii) $f_i \geq f_k$, $\forall f_k$ which has a subflow going over l. With this definition in place, the following result holds (Section 10.2 for the proof).

Theorem 3. If the adaptive waterfiller converges, it converges to a bandwidth bottlenecked point in the space of feasible flow-assignments.

One can show the max-min fair rate allocation is bandwidth bottlenecked (Section 10.3), although not all bandwidth-bottlenecked rate allocations are max-min fair. Hence, if the adaptive waterfiller converges, it converges to a point in a set that contains the optimal (max-min fair) rate allocation but it is not guaranteed to find the optimal allocation itself. This set, however, is significantly smaller than the feasible set, so the likelihood of finding the optimal rate is high. It is shown also that (Section 10.3 for proof) the adaptive waterfiller converges when it finds a bandwidth-bottlenecked rate allocation (i.e., it does not iterate thereafter). Although no theoretical characterization of convergence is available, it is found empirically that the method converges within five iterations (Section 4.4).

In sum, the adaptive waterfiller produces approximate rate assignments that are also feasible, and in a constrained set that contains the optimal. It is slower than approximate waterfiller, but much faster than geometric binner, so it is included as a standalone allocator. Moreover, operators can tune the number of iterations to trade off between fairness and speed.

3.5. Equi-Depth Binner

The final allocator addresses the shortcoming of geometric binner: fixed, variable-sized bins that can lead to unfair assignments. The geometric binning approximation can result in unfairness due to imbalance in how many flows end-up in each bin (Section 3.2). However, if initial estimates on flow rates were available (say, as provided by the adaptive waterfiller), then one could find bins that result in better quality solutions.

The 'equi-depth binner' (EB) uses the output of the adaptive waterfiller, sorts flows by the rates assigned to them, and assigns the same number of flows to each of $N_\beta$ bins. $N_\beta$ is a parameter that trades off fairness and efficiency for speed; smaller $N_\beta$s allow fast, efficient solutions at the expense of fairness. The equi-depth binner re-uses the geometric binner's formulation but allows the optimization to determine the best bin boundaries; in geometric binner, the bin boundaries are fixed. Since bin boundaries determine rates allocated to flows, this process implicitly refines the initial rate estimates. Equi-depth binner is slower than adaptive waterfilling because it incurs an extra single-shot optimization, but produces solutions with better fairness and efficiency. Thus, $$EquiBinning(\mathcal{V}, \varepsilon, \mathcal{D}, \mathcal{P}) \triangleq \qquad (7)$$

$$\underset{f,1}{\mathrm{argmax}} \sum_{b=1}^{N_\beta} \sum_{k \in \mathcal{D}_b} \epsilon^{b-1} f_k$$

$$\text{s.t. } f_k \le l_b + s_b \forall k \in \mathcal{D}_b, \forall b \in \{1, \dots, N_\beta - 1\}$$

$$f_k \ge l_{b-1} \forall k \in \mathcal{D}_b, \forall b \in \{2, \dots, N_\beta\}$$

$$l_b \ge 0 \forall b \in \{1, \dots, N_\beta\}$$

$$f \in FeasibleFlow(\mathcal{V}, \varepsilon, \mathcal{D}, \mathcal{P}),$$

where $l_b$ are the quantization boundaries (determined by the optimization), and $s_b$ are the slack in quantization boundaries (input to the optimization).

3.6. Allocator Summary

This disclosure begins with the observation that it is possible to formulate multi-resource, graph-based, multi-commodity flow max-min problems as a single-shot optimization using sorting networks. A set of fast, approximate, max-min fair allocators is developed with various properties using this insight (Table 3). These allocators are inspired by two qualitatively different approaches: algorithms based on waterfilling, and optimization-based approaches. Approximate and adaptive waterfillers fall into the former category, while the two binners fall into the latter category. As shown next, this suite is sufficient to dominate the state-of-the-art in TE and CS.

4. EVALUATION

TABLE 3

Summary of allocators and their properties

| Allocator | Properties |
| --- | --- |
| Geometric Binner | Guarantees worst-case fairness bounds |
| | Can exhibit unfairness due to bin imbalance |
| Approximate Waterfiller | No guarantees, fastest algorithm |
| | Invokes no optimizations |
| adaptive waterfiller | Slower than Approximate Waterfiller |
| | Guaranteed to find solutions in a set |
| | containing optimal |
| Equi-depth Binner | Empirically fairer and more efficient than other |
| | allocators Provides no guarantees |

4.0.1. Implementation

An instantiation of the disclosed suite of network-resource allocators was implemented in Python and C #which uses Gurobi 9.1.1 [Ref. 26] as the underlying optimization solver. For the production experiments, the implementation was integrated into the TE-pipeline at a production cloud.

4.0.2. Summary of Results

The disclosed network-resource allocators are shown to capture the trade off among speed, fairness, and efficiency for the TE problem. Moreover, all of the disclosed allocators are faster than the optimal algorithm by Danna et al. [Ref. 5] (referred to as Danna) and the more practical α-approximate fair SWAN algorithm [Ref. 4]. The disclosed algorithms match or exceed the efficiency and fairness of Danna and SWAN while running up to two orders of magnitude faster. Each of network-resource allocators is also able to trade off (a little) fairness and efficiency for up to three orders of magnitude in speed up.

The disclosed suite of network-resource allocators is demonstrated in general by applying it to CS problems where it outperforms the state of the art, Gavel [Ref. 2], by at least two orders of magnitude. The equi-depth binner (EB) achieves the same fairness and efficiency as Gavel (with waterfilling) with two orders of magnitude speed up.

Finally, the disclosed suite of network-resource allocators is also integrated into a production TE system: it achieves the same efficiency and fairness as the existing production solver while being up to four times faster.

This section evaluates how the disclosed approximations compare in terms of speed, fairness, and efficiency. Shown also is that each of the disclosed allocators scales to one of the largest WAN topologies (over 1000 nodes and 1000 edges) which is significantly larger than those in [Ref. 5], [Ref. 3], [Ref. 4], [Ref. 27], [Ref. 28] and matches the size of topologies used in [Ref. 1]. Finally, design features are evaluated as well as the allocators' sensitivity to demand variations and other relevant inputs.

4.1. Benchmarks, Metrics, and Setup

4.1.1. Benchmarks

The disclosed suite of network-resource allocators was evaluated on two different problem domains: WAN-TE and CS (Section 2). State-of-the-art solutions were used in each of these domains as benchmarks:

WAN-TEs. Danna [Ref. 5], SWAN [Ref. 4], and a modified version of the k-waterfilling algorithm [Ref. 29] were used as benchmarks. Also provided are limited comparisons with the B4 [Ref. 3] for completeness (Section 4.2). The k-waterfilling algorithm only applies to single-path, infinite-demand scenarios; this is extended to account for multi-path, demand constrained problems. Each benchmark is tuned for maximum speed (Section 11.1). Traces and the topology from a large production WAN are used as well as the synthetic traffic generator from NCFlow [Ref. 1] on topologies from the Topology Zoo [Ref. 30]. K-shortest paths [Ref. 31] are used to route flows between node pairs (K=16 unless mentioned otherwise).

CS. The disclosed suite of network-resource allocators is compared to Gavel [Ref. 2], the state of the art in CS. A comparison is made both to Gavel's publicly available implementation and to an extension augmented with water-filling to improve its fairness (Section 4.3). Job requests are generated from Gavel's job generator: it is assumed that three GPU types and uniformly sample jobs from the 26 different job types in Gavel. Jobs are heterogeneous: they require a different number of workers (which are derived from the Microsoft public trace [Ref. 32]) and have different priorities (which are sampled uniformly from the set {1, 2, 4, 8}).

4.1.2. Metrics

The following metrics are used for comparisons:

Fairness. Danna and Gavel compute the optimal max-min fair resource allocation in TE and CS respectively: fairness numbers are reported relative to the outcomes they produce. To do so, one needs to compute how far a particular allocation (f) is, in terms of fairness, from the rates produced by the optimal allocator (f*)—i.e., a fairness distance is desired. The $q_\theta$ metric [Ref. 33], [Ref. 34] is used as a measure of fairness for a given flow $f_i$. This metric is resilient to numerical instability with small values and is computed as min $$\left( \frac{\max(f_i, \theta)}{\max(f_i^*, \theta)}, \frac{\max(f_i^*, \theta)}{\max(f_i, \theta)} \right).$$

The geometric mean of $q_\theta$ across flows is reported as the overall fairness measure (the geometric mean is less sensitive to outliers compared to the arithmetic mean). For these evaluations, $\theta=0.01\%$ of the resource (link or GPU) capacities is used.

Efficiency. Efficiency in TE is measured as the total rate allocated across flows relative to Danna $$\left( \text{i.e., } \frac{e}{e_{danna}} \right).$$

The effective throughput in CS is reported, which is the job's perception of performance based on a given allocation. CS efficiency is reported relative to Gavel $$\left( \text{i.e., } \frac{e}{e_{gavel}} \right).$$

Runtime. In most cases a speed up (i.e., relative run-time is reported compared to a baseline) i.e., $$\frac{s_{baseline}}{s}.$$

Run times consist of the time it takes to compute the rate-allocations for each algorithm. Runtimes are measured on an AMD Operation 2.4 GHz CPU (6234) with 24 cores and 62 GB of memory.

Figure 9:
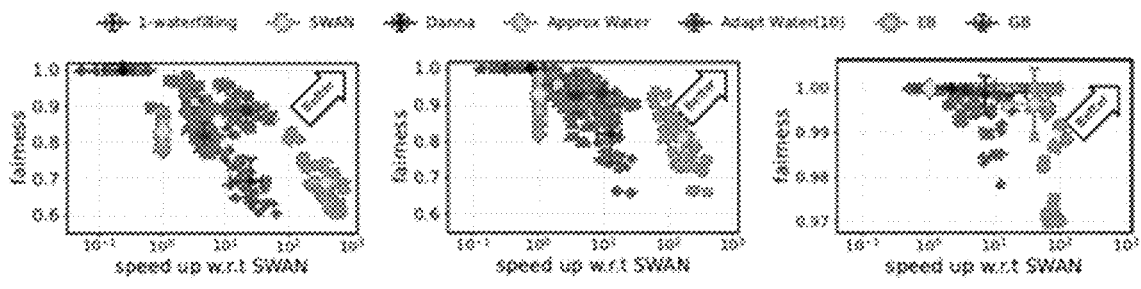
FIG. 9 shows an example comparison of fairness versus speed across different resource-allocation approaches.

FIG. 9 shows the fairness vs speed trade off across different approaches. As in [Ref. 1], the scale-factor is used to denote the level of load. It is observed that even the slowest algorithm in the disclosed suite is faster than SWAN and Danna. While 1-waterfilling is faster than most of the algorithms in the disclosed suite it has to sacrifice much more in terms of fairness (it is 30% less fair than Danna in the high load case).

TABLE 4

Topologies used for the evaluation of the disclosed suite of network-resource allocators.

| Topology | # Nodes | # Edges |
|---|---|---|
| WANLarge | ~1000 s | ~1000 s |
| WANSmall | ~100 s | ~1000 s |
| Cogentco | 197 | 486 |
| UsCarrier | 158 | 378 |
| GtsCe | 149 | 386 |
| TataNld | 145 | 372 |

Figure 10:
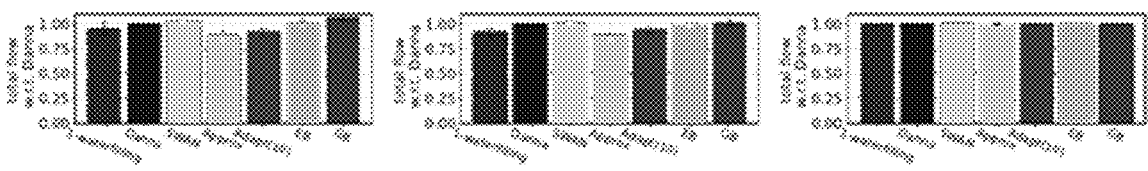
FIG. 10 illustrates the efficiency of selected algorithms herein versus selected benchmarks, in non-limiting examples.

FIG. 10 shows the efficiency of the disclosed algorithms versus selected benchmarks. Numbers are reported relative to Danna. The disclosed suite of network-resource allocators Pareto dominates SWAN, 1-waterfilling, and Danna on the efficiency, agility, and fairness plane.

4.2. Traffic Engineering in WAN

Table 4 summarizes the topologies used in the evaluation. For topologies from Topology Zoo, traffic using Poisson [Ref. 35], Uniform, Bimodal, and Gravity [Ref. 35], [Ref. 36] distributions. Traffic is generated using the methodology of NCFlow [Ref. 1], which can generate traffic at different scale factors. Traffic spans a range of loads: light (scale factors {1, 2, 4, 8}), medium ({16, 32}), and high ({64, 128}). At higher loads, more flows compete for traffic than at medium or light loads. For production experiments, traces are used from a production cloud. Results of over 640 experiments are reported, which capture different traffic and topology combinations.

4.2.1. Comparison to Benchmarks

All of the disclosed algorithms are faster than SWAN and Danna (FIG. 9, where the speed up is reported relative to SWAN). Each approach is shown in a different color in this plot. Each point corresponds to a single traffic demand on a single topology and the plot shows the centroid of these points as well as the mean and standard deviations along the fairness and speedup axes.

In FIG. 9, the trade off is seen across these different max-min fair network-resource allocators: (a) while Danna is the optimum max-min fair algorithm, it is slower by far than all other approaches (4.3× slower than the second slowest algorithm, SWAN, on average under high-load); (b) 1-waterfilling is the fastest of the baselines; the Approximate Waterfiller is faster and provides the same level of fairness— but suffers because it does not consider flow-level fairness (30% less fair than Danna on average while being four orders of magnitude faster); (c) SWAN sits somewhere between these two approaches, it is faster than Danna as it reduces the number of optimizations it needs to solve, but is slower than 1-waterfilling (1-waterfilling does not solve any linear programs); similarly, SWAN is more fair than 1-waterfilling but unlike Danna does not achieve optimal max-min fairness; (d) the disclosed suite of network-resource allocators Pareto-dominates these baselines as each of its algorithms provide a different point on the space of trade offs.

The algorithms herein are most effective under high-load (where, arguably, speed matters and fairness matters most) where even the slowest disclosed allocator (Geometric Binner or GB) outperforms SWAN in runtime by 4.5× on average (6× in the 90$^{th}$ percentile), by only solving a single optimization while providing worst-case fairness guarantees. The Equi-Depth Binner (EB) is slightly slower than GB, but is fairer; it is also faster than SWAN. The Approximate Waterfiller is faster (by an order of magnitude) even than 1-waterfilling with the same flow-level fairness. Finally, the adaptive waterfiller results in improved fairness (19% higher on average) at a slight reduction in speed (although it is still 21.4× faster than SWAN on average).

FIG. 10 compares the efficiency of these alternatives. At low load (c), all schemes have comparable efficiency, but the differences become evident at high load (a), where EB and GB have efficiency comparable to Danna (as does SWAN). In fact, GB and SWAN are more efficient than Danna, likely because they sacrifice some fairness.

Figure 11:
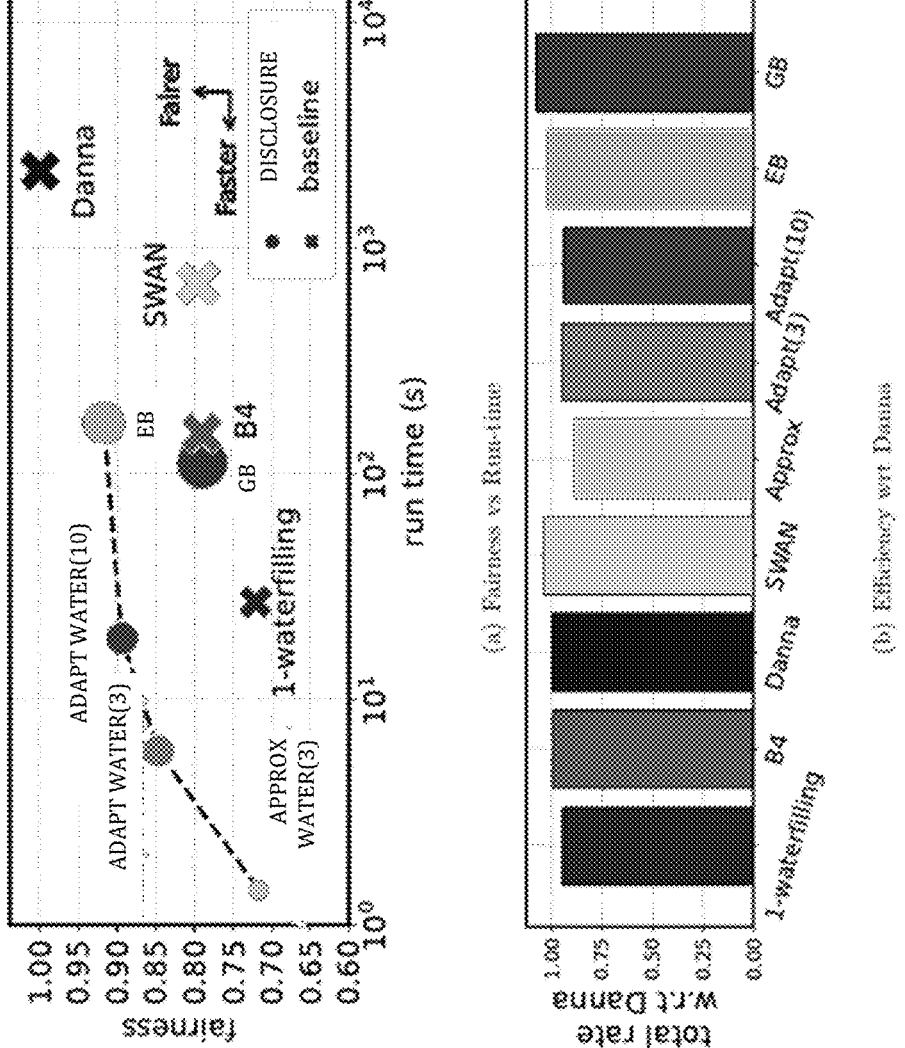
FIG. 11 illustrates the Pareto-dominance of the methods herein over all baselines of an example topology.

FIG. 11 shows the Pareto-dominance of the disclosed suite of network-resource allocators over all of the baselines on an example topology (Cogentco) where a 64× scale factor is used. The size of the markers in (b) are in proportion to the efficiency each algorithm achieves; an exact comparison is reported in (c).

These performance differences become more evident when looking more closely at results on an individual topology (Cogentco). The disclosed allocators Pareto-dominate other approaches (FIG. 11): the approximate waterfiller, adaptive waterfiller algorithms (for two different choices of the number of iterations, 3 and 10), and EB are faster than SWAN and Danna; others are fairer than SWAN and have comparable efficiency. Operators can also use GB when they need strong worst-case guarantees (at the cost of reduced fairness). Finally, FIG. 11 shows that B4 [Ref. 3]'s TE algorithm is comparable in speed and fairness to GB (albeit is slightly less efficient), but does not provide worst-case performance guarantees.

Figure 12:
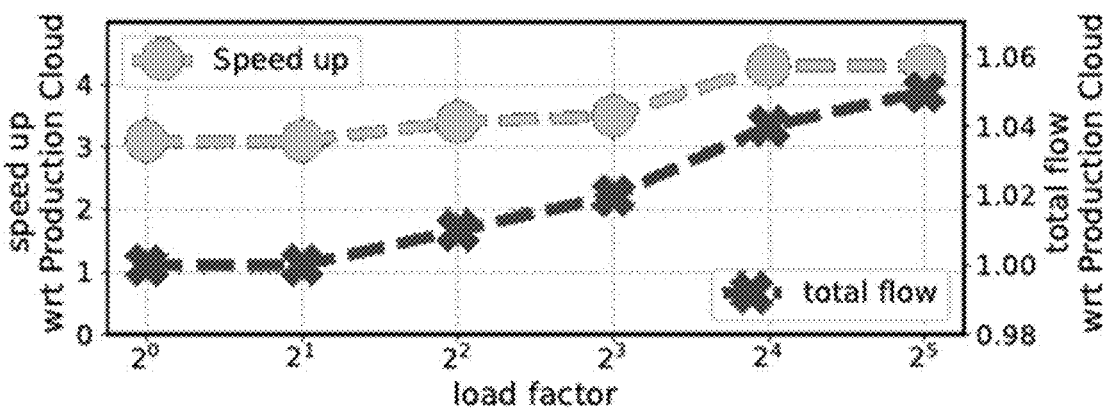
FIG. 12 provides an example comparison between the disclosed network-resource allocators and another TE Solver.

FIG. 12 shows the disclosed suite of network-resource allocators vs production cloud's TE Solver. Load-factors are used as in [Ref. 1]. The gains change as loads increase.

In summary, in settings where Danna's runtime is impractical, the disclosed allocators outperform other TE algorithms (SWAN, 1-waterfilling, B4). Depending on the required speed and fairness, users can choose the adaptive or approximate waterfillers, or EB (or GB if worst-case fairness bounds are important). Moreover, they can also tradeoff speed for fairness by changing the number of iterations of adaptive waterfiller.

Figure 13:
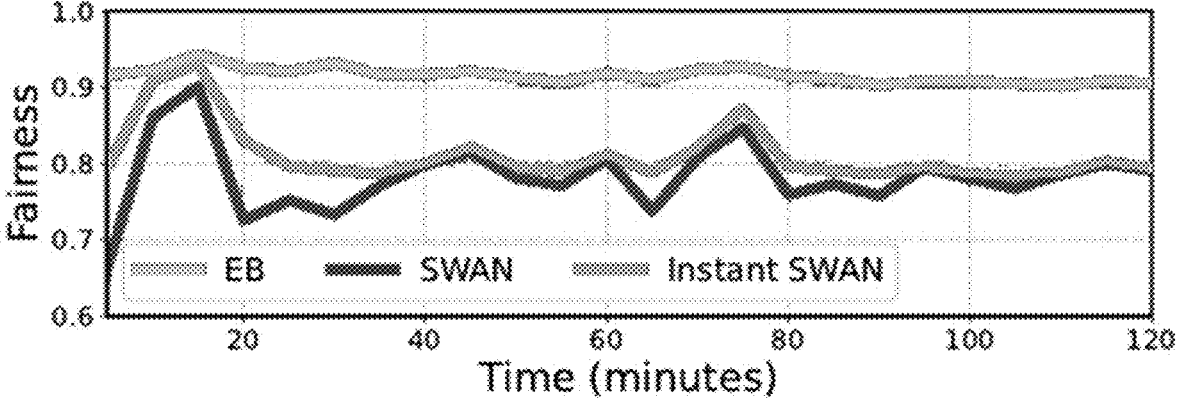
FIG. 13 shows an example effect of solver runtime on fairness, in medium-load traffic, pursuant to demand change.

FIG. 13 shows the effect of solver runtimes on fairness when demand changes in Cogentco following NCFlow's change distribution [Ref. 1] on medium load traffics.

4.2.2. Integration with Production

The disclosed suite of network-resource allocators was integrated into a production cloud's WAN TE controller. GB was selected, as it has the same fairness guarantees as the existing TE-solver. The benefit of the disclosed suite of network-resource allocators is shown in this setting in FIG. 12 under different loads: the disclosed allocators speed up this solution by 3.1×-4.3× while matching (in some cases improving by 1%-5%) the efficiency; in all cases it is within 1% of the production solver's fairness. Intuitively, GB's speedup increases relative to the production solver because the latter invokes more optimizations at higher loads. GB's efficiency also increases because its ∈-trick can exploit minor fairness violations (due to binning) to improve efficiency.

Figure 14:
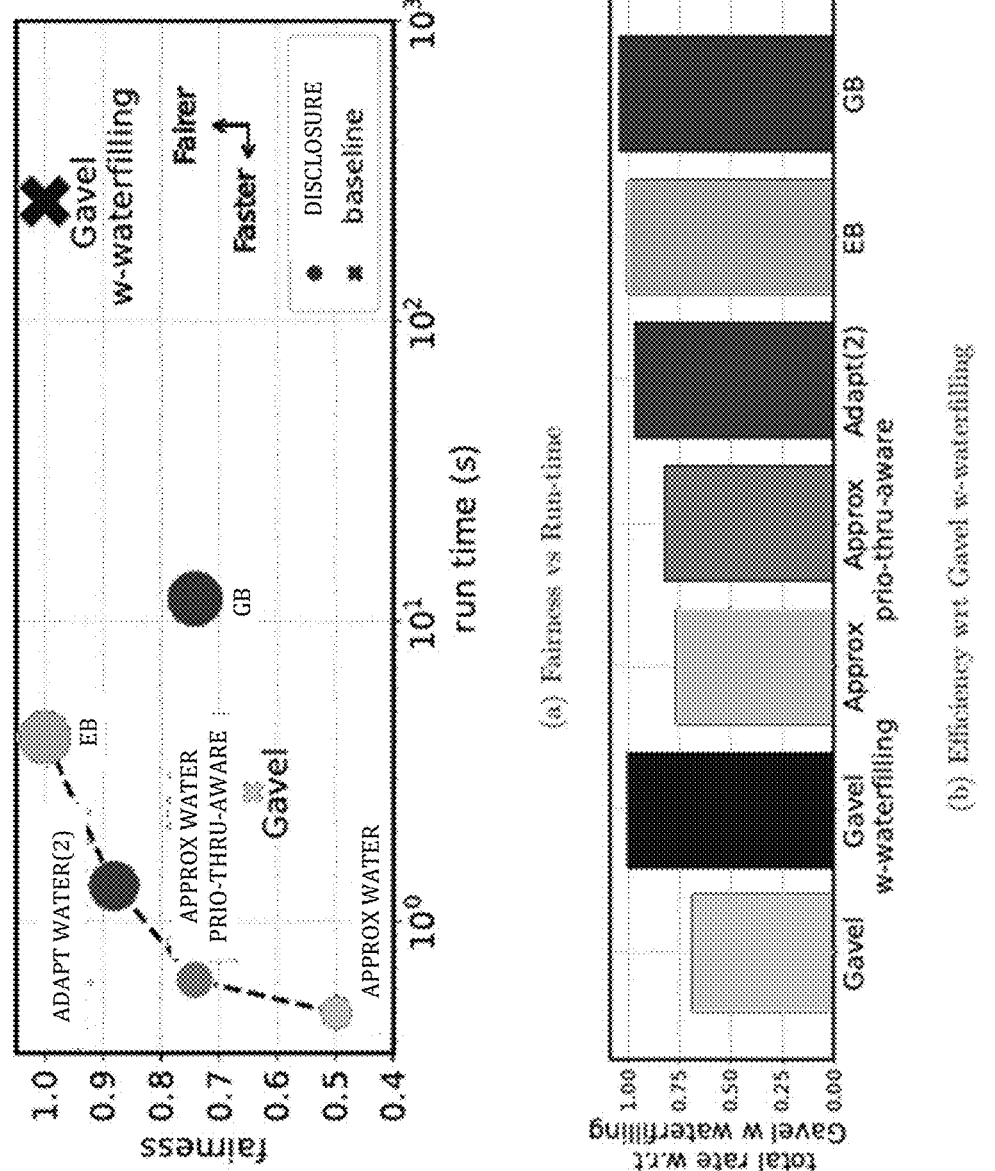
FIG. 14 illustrates an example trade off in efficiency, fairness, and agility in cluster scheduling (CS), based on an example scenario.

FIG. 14 shows observing the trade off in efficiency, fairness, and agility in CS on an example scenario (with 8192 jobs). (a) shows the fairness vs run-time behavior of the different approaches; (b) shows the efficiency relative to the modified Gavel algorithm. The disclosed algorithms are found to Pareto dominate Gavel and the modified Gavel.

4.2.3. Tracking Changing Demands

FIG. 13 shows the ability of each method to track demands. Each method is evaluated on a sequence of traffic, arriving every five minutes (a window) starting from a medium load traffic demand. The change in traffic from one window to the next follows the change distribution in NCFlow [Ref. 1]. SWAN, in this scenario, needs two windows to compute each allocation; hence, it only computes allocations for half of the demands. This leads to up to a 10% reduction in fairness compared to a instant SWAN (a hypothetical scheme that can compute the allocation instantly). EB$^4$, however, is fast enough to keep track of changes and meet all the deadlines. In general, SWAN's inability to keep track of demands leads to higher unfairness than EB (relative to that reported in FIG. 9). Also, in moving from medium to high load, the difference is expected to be greater as SWAN is even slower and needs to solve more optimizations.

$^4$GB is faster than EB, so if the latter can keep up, so can GB.

Figure 15:
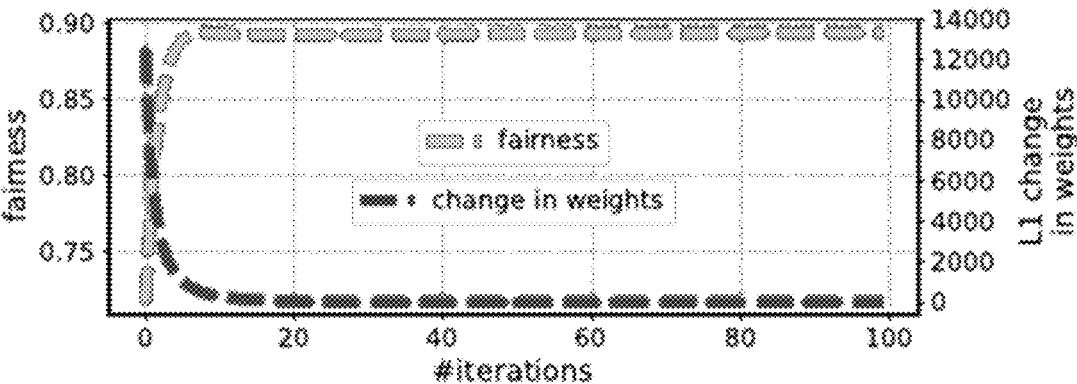
FIG. 15 provides a convergence-and-sensitivity analysis for some of the solver implementations herein.
Figure 15:
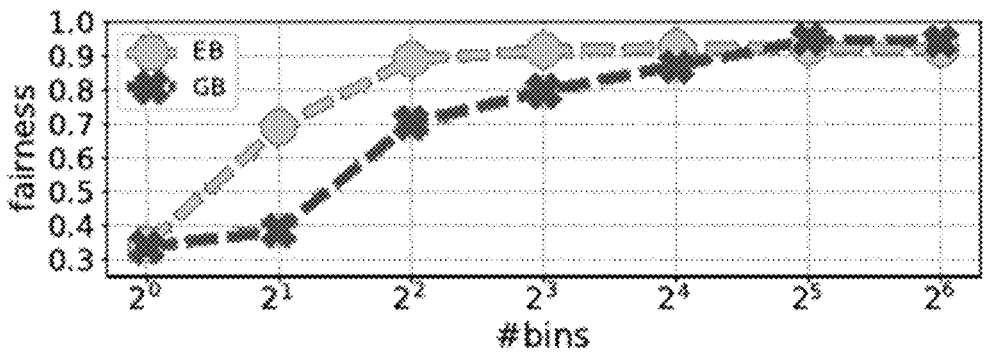
Figure 15:
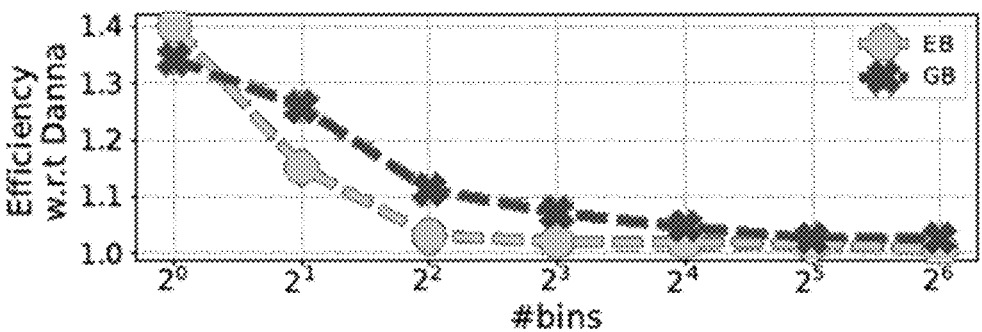

FIG. 15 shows convergence and sensitivity analysis. (a) convergence of the multi-path waterfilling approximation in a given example. (b, c) users can trade off between fairness and efficiency in both equi-depth binner and geometric binner by changing the number of bins (less number of bins lead to higher efficiency at the cost of lower fairness).

4.3. Cluster Scheduling

For CS, experiments were run over 40 different scenarios. These scenarios were generated using Gavel's job generator where the number of competing jobs is selected uniformly at random from the set {1024, 2048, 4096, 8192}. The results match observations from WAN-TE; the disclosed allocators outperform both Gavel and Gavel with waterfilling in terms of speed. These results are presented hereinafter, in FIG. 21.

Figure 16:
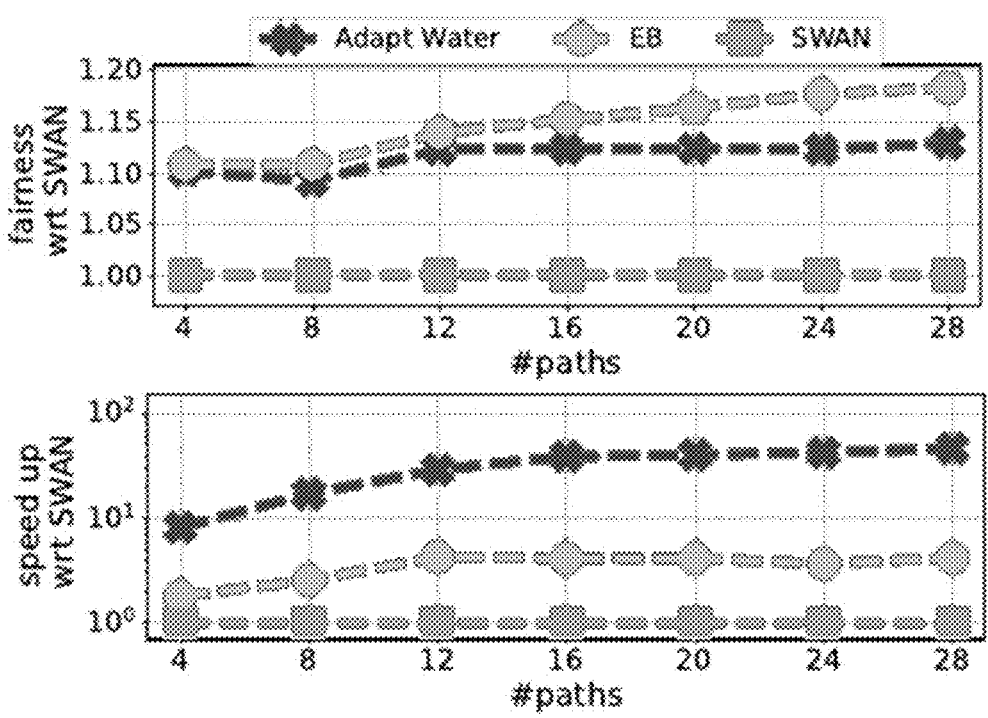
FIG. 16 illustrates an example impact of the number of resources (i.e., paths) in multi-resource TE set up.

FIG. 16 shows the impact of number of resources (i.e., paths) in multi-resource TE set up. Increasing the number of resources increases the fairness and speed up gain of the disclosed suite of network-resource allocators compared to SWAN.

This disclosure provides further insight into the performance of the disclosed network-resource allocators through an example scenario where 8192 jobs compete for resources (FIG. 14). adaptive waterfiller outperforms standard Gavel in fairness, efficiency, and speed. For CS, GB is slower than Gavel and only marginally fairer (because of bin imbalance Section 3.2), but has much higher efficiency. While Gavel can be improved by augmenting it with waterfilling [Ref. 2], this results in substantial slow-down. In contrast, EB provides comparable fairness and efficiency as Gavel w/ waterfilling, while being almost 2 orders of magnitude faster.

4.4. Convergence and Sensitivity Analysis

Figure 17:
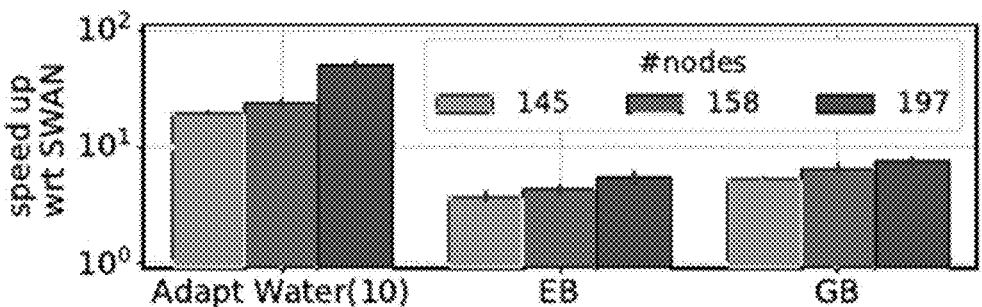
FIG. 17 shows aspects of the impact of topology size on the speed of network-resource allocation.

FIG. 17 shows aspects of the impact of topology size. The speed of the disclosed suite of network-resource allocators with respect to SWAN improves with the size of the topology.

4.4.1. Convergence

The convergence behavior of the adaptive waterfiller was evaluated empirically. These theorems from Section 3.3 show that when it converges, it converges to a bandwidth-limited allocation; in addition, it converges if it finds a bandwidth-limited allocation; if it does not find a bandwidth-limited allocation it may not converge. It was found, empirically, that the adaptive waterfiller always converges. FIG. 15 shows how its weights and fairness properties change with the number of iterations: the weights stabilize after five iterations.

4.4.2. Impact of Number of Bins

FIG. 15 at (b) and (c) shows fairness and efficiency of binners GB and EB for different number of bins. The disclosed suite of network-resource allocators uses this parameter to tune the trade off between efficiency and fairness for these methods. Using more bins results in higher fairness because the number of flows (or jobs) inside each bin decreases and, at the same time, increases the run-time since the optimization includes more variables. Fewer bins increase efficiency but at the cost of fairness. In FIG. 15 at (b), it was observed also that EB is fairer than GB for up to 16 bins as GB suffers from imbalanced bins. However, for ≥32 bins, GB does not incur bin imbalance, so the fairness of both methods is roughly the same; the slightly lower fairness of EB is because of the slight error in the estimated order of rates from the adaptive waterfiller (which influences the binning in EB).

4.5. Other Experiments 4.5.1. Effect of Number of Paths

These experiments use 16 resources (e.g., paths in TE) to split each demand in multi-resource max-min fair allocation. The two fairest methods (i.e., adaptive waterfiller and EB) were compared against SWAN while changing this parameter (FIG. 16), and find increasing the number of paths improves the benefit of the disclosed allocators in both speed up and fairness. With more paths, SWAN invokes more optimizations, and adaptive waterfiller as well as EB can exploit path diversity better to get better fairness.

4.5.2. Effect of Topology Size

Similarly, the benefit of the disclosed allocators increases with the topology size (FIG. 17): at larger topology sizes, SWAN needs to solve more optimizations while the number of optimizations to be solves is fixed (=1 for EB/GB and =0 for the adaptive waterfiller).

5. DISCUSSION

The disclosed suite of network-resource allocators allows operators to configure the trade off they desire among fairness, speed, and efficiency. Its allocators solve a multi-resource allocation problem but they easily apply to single-resource settings. Experiments show that the Approximate Waterfiller performs an order of magnitude faster, with minor degradation in efficiency, the fastest single-network-resource allocator k-waterfilling (omitted for lack of space).

6. RELATED WORK

The work on finding max-min fair resource allocation spans:

6.0.1. Max-Min Fair TE and CS Solutions

Prior approaches to both TE and CS aim to produce fast solutions to max-min fair resource allocations [Ref. 4], [Ref. 2], [Ref. 3], [Ref. 5], [Ref. 12], [Ref. 29], [Ref. 18], [Ref. 37], [Ref. 38], [Ref. 7], [Ref. 8]. As shown in Section 4 the disclosed suite of network-resource allocators outperforms the state of the art in multi-path max-min fair resource allocation (i.e., SWAN, Danna, B4, waterfilling, and Gavel). Other work applies only to single-path/single-resource settings (e.g., [Ref. 29], [Ref. 18]) and cannot be easily extended to a multi-path/multi-resource scenario.

6.0.2. Applications of Max-Min Fair Resource Allocation

Solving the graph-wide max-min fair resource allocation problem arises in many domains [Ref. 39], [Ref. 25], [Ref. 29], [Ref. 40], [Ref. 41], [Ref. 19], [Ref. 20]. This disclosure demonstrates that the disclosed suite of network-resource allocators provides significant benefits in WAN-TE and CS problems. The disclosed algorithms are believed to apply to other domains where graph-based, centralized, max-min fair resource allocation is desired, but extending to these other domains is outside the current scope.

6.0.3. Algorithms for Computing Max-Min Fair Rates

Prior work has expanded understanding of max-min fair resource allocation [Ref. 42], [Ref. 43]. These studies are largely theoretical and do not provide a practical and fast solution. The work of [Ref. 44] is a bandit-based solution, however; it lacks any worst-case performance guarantees and does not provide any means of trading off fairness, efficiency, and speed.

7. ADDITIONAL DISCLOSURE, REFERENCES, AND CONCLUSION

The disclosed suite of network-resource allocators enables fast multi-resource max-min fair allocations for a class of problems that include traffic engineering and cluster scheduling. Based on the crucial insight that these problems can be solved using at most one optimization invocation, This disclosure provides a suite of allocators for max-min fair allocations that spans a range of speeds, some of which have useful theoretical properties, and all of which are faster by an order of magnitude than the state of the art, or fairer and more efficient, or both. A production cloud plans to mainline one of the allocators into their TE production pipeline.

Supported by example in the sections above and in the appendices further below, the following additional disclosure reprises more compactly the technical solutions herein.

Figure 18:
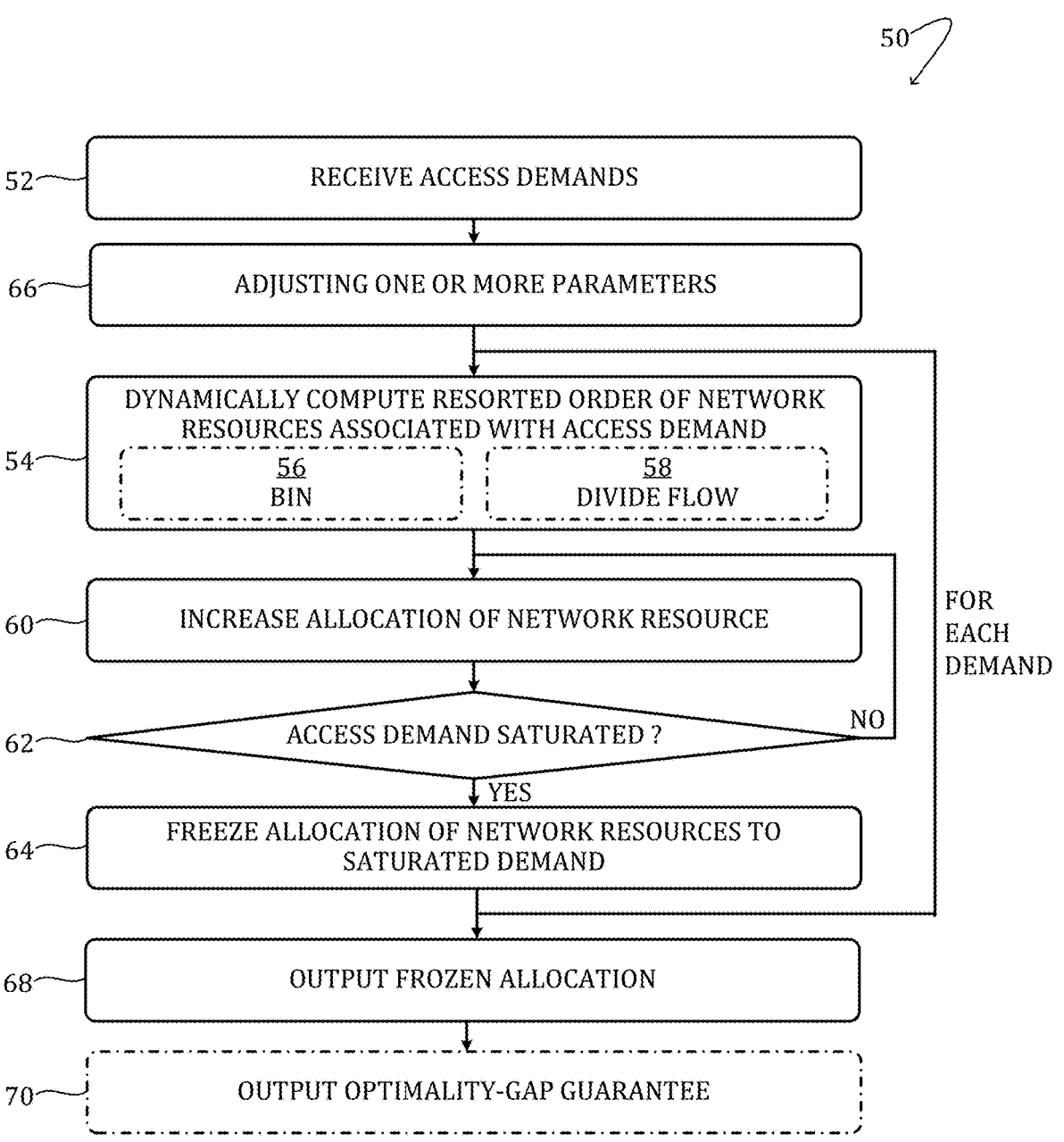
FIG. 18 shows aspects of an example method for allocating a plurality of network resources to a plurality of network-access demands of a plurality of network guests.

FIG. 18 shows aspects of an example method 50 for allocating a plurality of network resources to a plurality of network-access demands of a plurality of network guests. The nature of the network resources is not at all limited. In some examples, any, some, or all of the plurality of network resources may be a network link (e.g., a router) on a wide-area network (WAN) comprising a plurality of network links. In some examples, any, some, or all of the plurality of network resources may be a processor of a processor cluster—e.g., a CPU or GPU cluster. Each of the plurality of network guests may be, in some examples, a guest process executing on the network. In other examples each of the plurality of network guests may be a guest user account of the network. More generally, the term 'network' as used herein is not limited to communications or processor networks but applies equally to any network or 'graph' of interconnected resource objects. Method 50 may be enacted at regular intervals in some scenarios—e.g., once every ten minutes, once every five minutes, etc. In other scenarios the method may be enacted pursuant to resource-allocation failure. Such failure may be detected by any suitable network or guest technology.

At 52 of method 50 the network-resource allocator receives a plurality of network-access demands. After receiving the plurality of network-access demands, the network-resource allocator loops through each of the demands. At 54, for each of the plurality of network-access demands received, the network-resource allocator dynamically computes, from among the plurality of network resources, a re-sorted order of resources associated with that network-access demand. In some examples a sorting network is executed in order to reveal the re-sorted order. In some examples the re-sorted order ranks each associated network resource by flow rate. The ranking may be exact in some examples and instances: in other words the re-sorted order computed at 54 may comprise the actual order of associated network resources sorted by flow rate. In other examples and instances, the re-sorted order may approximately rank each associated network resource by flow rate. Accordingly the ranking may be subject to a certain error.

In some examples dynamically computing the re-sorted order comprises, at 56, binning the flow rate of each associated network resource into a plurality of bins of geometrically increasing bin size. This methodology is implemented in at least two of the solver implementations described herein—i.e., the geometric binner and the equi-depth binner.

In some examples the flow rate of each associated network resource is a portion of the available flow rate of that network resource, divided among plural network-access demands on the network resource. Such demands may correspond to individual flows traversing a given network link, for example. In those examples the act of freezing the allocation (vide infra) freezes all allocations of the network resource. This methodology is practiced in the approximate waterfiller, adaptive waterfiller, and equi-depth binner solver implementations, for instance. In these examples, the act of dynamically computing the re-sorted order comprises, at 58, dividing the available flow.

In the approximate waterfiller implementation, the portion of the available flow rate allocated to a given network-access demand is one of a plurality of equal-size portions. That feature is not strictly necessary, however, for the division is weighted differently in other implementations. In the adaptive waterfiller implementation, for instance, the portion of the available flow rate is one of a plurality of weighted portions. To support that feature, flow-division step 58 further comprises weighting the portion to more fairly allocate the associated network resource. In the equi-depth binner, the portion of the available flow rate provides a flow-rate estimate; this flow-rate estimate is used in order to compute one or more bin boundaries for binning the plurality of network resources by flow rate.

At 60 of method 50, for each network resource associated with the network-access demand, the network-resource allocator increases, in the re-sorted order, an allocation of the network resource to the network-access demand. In some examples each 'allocation' of a network resource refers to a bandwidth allocation. In examples in which the re-sorted order ranks each associated network resource by flow rate, increasing the allocation maximizes the allocation of each associated network resource in order of increasing flow rate. In examples in which the re-sorted order approximately ranks each associated network resource by flow rate, increasing the allocation maximizes the allocation of each associated network resource in approximate order of increasing flow rate. The allocation is increased until, at 62, it is determined that the network-access demand is saturated. When the network-access demand is saturated, then the allocation of each of the plurality of network resources is frozen, at 64, to the saturated demand. In other words, the allocations are not increased further in the current execution of method 50 by the network resource allocator. In subsequent executions of the method, all allocations may start afresh.

In some examples, iterative application of steps 54 through 64 allocates the plurality of network resources in a single, convex optimization subject to an exact, relaxable, or approximate max-min fairness condition. For instance, the max-min fairness condition may be parametrically relaxable by adjustment of one or more parameters, thereby increasing network efficiency and/or reduces allocation latency. In such examples, method 50 may further comprise, at 66, adjusting the one or more parameters that relaxes the max-min fairness condition. In some examples the max-min fairness condition may be directed to network neutrality.

At 68 the frozen allocation of each of the plurality of network resources for each of the plurality of network-access demands is provided as output. Such output may take the form of a machine-readable file, which is read by control componentry of the host network. Alternatively, the output may be furnished as a data structure saved in computer memory accessible to the control componentry. These and other suitable forms of output are equally envisaged. In this way the network-control hardware can be coerced to provide the allocation with the frozen amounts. At 70 the output engine optionally outputs an optimality-gap guarantee for fairness of each frozen allocation.

Figure 19:
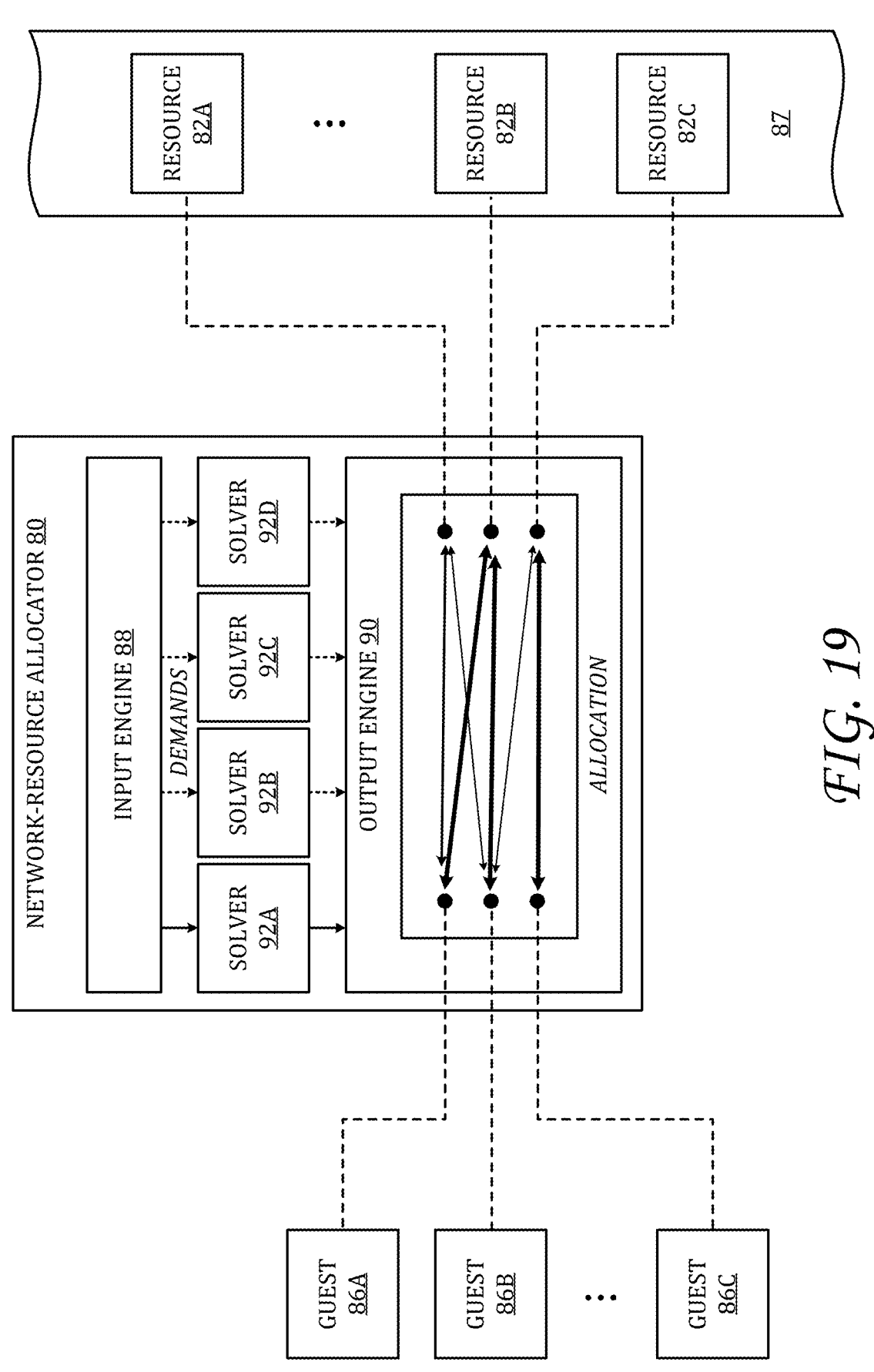
FIG. 19 shows aspects of an example network-resource allocator.

FIG. 19 shows aspects of an example network-resource allocator 80 configured to allocate a plurality of network resources 82 to a plurality of network-access demands of a plurality of network guests 86 on a network 87. The network-resource allocator comprises an input engine 88, an output engine 90, and at least one solver 92A. Example solver implementations include geometric binner, approximate waterfiller, adaptive waterfiller, and equi-depth binner implementations, as described herein.

Input engine 88 is configured to furnish the plurality of network-access demands to solver 92A. The solver is configured to execute at least one of the methods described herein in the context of FIG. 18. In particular, the solver is configured to (a) receive the plurality of network-access demands from the input engine, and (b) for each of the plurality of network-access demands, dynamically compute a re-sorted order of network resources associated with that network-access demand from among the plurality of network resources, and, for each network resource associated with the network-access demand, increase, in the re-sorted order, an allocation of the associated network resource to the network-access demand until the network-access demand is saturated, and freeze the allocation of each of the plurality of network resources to the saturated network-access demand. Output engine 90 is configured to output each frozen allocation of each of the plurality of network resources for each of the plurality of network-access demands.

In the illustrated example, network-resource allocator 92A is one of a plurality of integrated network-resource allocators differing with respect to fairness, efficiency, and speed. In some examples and scenarios, the plurality of network-access demands is furnished to a particular solver (and excluded from other solvers) based on parameters received through the input engine.

Figure 20:
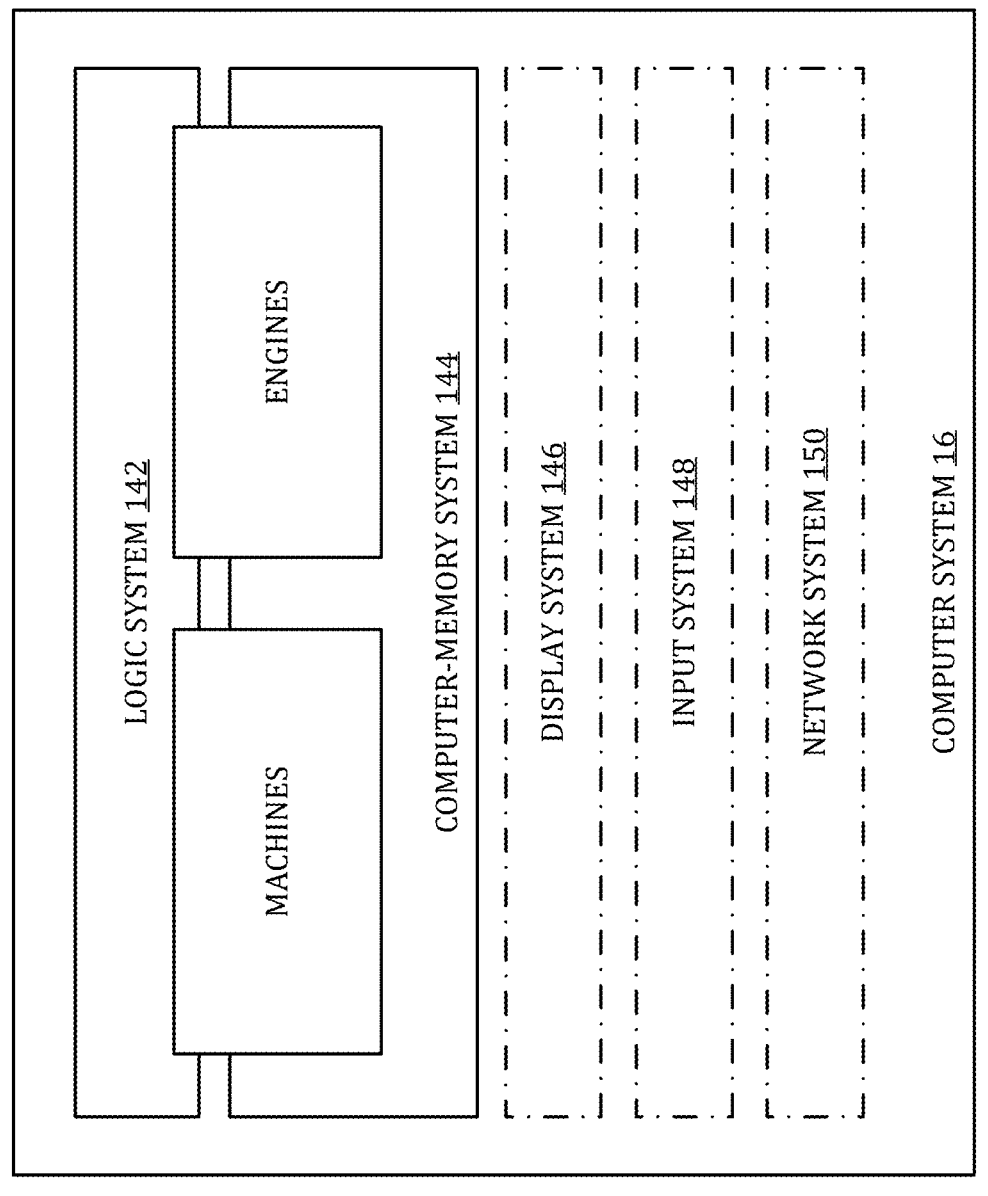
FIG. 20 shows aspects of an example computer system.

Generally speaking, network-resource allocator 80 is a particularly configured component of a computer system— e.g., a computer system as illustrated in FIG. 20. The various subcomponents of the network-resource allocator correspond to the 'machines' and 'engines' in the description below.

The methods herein may be tied to a computer system of one or more computing devices. Such methods and processes may be implemented as an application program or service, an application programming interface (API), a library, and/or other computer-program product.

FIG. 20 provides a schematic representation of a computer system 102 configured to provide some or all of the computer system system functionality disclosed herein. computer system 102 may take the form of a personal computer, application-server computer, or any other computing device.

Computer system 102 includes a logic system 104 and a computer-memory system 106. computer system 102 may optionally include a display system 108, an input system 110, a network system 112, and/or other systems not shown in the drawings.

Logic system 104 includes one or more physical devices configured to execute instructions. For example, the logic system may be configured to execute instructions that are part of at least one operating system (OS), application, service, and/or other program construct. The logic system may include at least one hardware processor (e.g., microprocessor, central processor, central processing unit (CPU) and/or graphics processing unit (GPU)) configured to execute software instructions. Additionally or alternatively, the logic system may include at least one hardware or firmware device configured to execute hardware or firmware instructions. A processor of the logic system may be single-core or multi-core, and the instructions executed thereon may be configured for sequential, parallel, and/or distributed processing. Individual components of the logic system optionally may be distributed among two or more separate devices, which may be remotely located and/or configured for coordinated processing. Aspects of the logic system may be virtualized and executed by remotely-accessible, networked computing devices configured in a cloud-computing configuration.

Computer-memory system 106 includes at least one physical device configured to temporarily and/or permanently hold computer system information, such as data and instructions executable by logic system 104. When the computer-memory system includes two or more devices, the devices may be collocated or remotely located. Computer-memory system 106 may include at least one volatile, nonvolatile, dynamic, static, read/write, read-only, random-access, sequential-access, location-addressable, file-addressable, and/or content-addressable computer-memory device. Computer-memory system 106 may include at least one removable and/or built-in computer-memory device. When the logic system executes instructions, the state of computer-memory system 106 may be transformed—e.g., to hold different data.

Aspects of logic system 104 and computer-memory system 106 may be integrated together into one or more hardware-logic components. Any such hardware-logic component may include at least one program- or application-specific integrated circuit (PASIC/ASIC), program- or application-specific standard product (PSSP/ASSP), system-on-a-chip (SOC), or complex programmable logic device (CPLD), for example.

Logic system 104 and computer-memory system 106 may cooperate to instantiate one or more logic machines or engines. As used herein, the terms 'machine' and 'engine' each refer collectively to a combination of cooperating hardware, firmware, software, instructions, and/or any other components that provide computer system functionality. In other words, machines and engines are never abstract ideas and always have a tangible form. A machine or engine may be instantiated by a single computing device, or a machine or engine may include two or more subcomponents instantiated by two or more different computing devices. In some implementations, a machine or engine includes a local component (e.g., a software application executed by a computer system processor) cooperating with a remote component (e.g., a cloud computing service provided by a network of one or more server computer systems). The software and/or other instructions that give a particular machine or engine its functionality may optionally be saved as one or more unexecuted modules on one or more computer-memory devices.

Machines and engines may be implemented using any suitable combination of machine learning (ML) and artificial intelligence (AI) techniques. Non-limiting examples of techniques that may be incorporated in an implementation of one or more machines include support vector machines, multilayer neural networks, convolutional neural networks (e.g., spatial convolutional networks for processing images and/or video, and/or any other suitable convolutional neural network configured to convolve and pool features across one or more temporal and/or spatial dimensions), recurrent neural networks (e.g., long short-term memory networks), associative memories (e.g., lookup tables, hash tables, bloom filters, neural Turing machines and/or neural random-access memory) unsupervised spatial and/or clustering methods (e.g., nearest neighbor algorithms, topological data analysis, and/or k-means clustering), and/or graphical models (e.g., (hidden) Markov models, Markov random fields, (hidden) conditional random fields, and/or AI knowledge bases)).

When included, display system 108 may be used to present a visual representation of data held by computer-memory system 106. The visual representation may take the form of a graphical user interface (GUI) in some examples. The display system may include one or more display devices utilizing virtually any type of technology. In some implementations, display system may include one or more virtual-, augmented-, or mixed reality displays.

When included, input system 110 may comprise or interface with one or more input devices. An input device may include a sensor device or a user input device. Examples of user input devices include a keyboard, mouse, or touch screen.

When included, network system 112 may be configured to communicatively couple computer system 102 with one or more other computer systems. The network system may include wired and/or wireless communication devices compatible with one or more different communication protocols. The network system may be configured for communication via personal-, local- and/or wide-area networks.

The interested reader is referred to the following references, which are hereby incorporated by reference herein for all purposes.

[Ref. 1] Firas Abuzaid, Srikanth Kandula, Behnaz Arzani, Ishai Menache, Matei Zaharia, and Peter Bailis, "Contracting Wide-area Network Topologies to Solve Flow Problems Quickly" 18*th USENIX Symposium on Networked Systems Design and Implementation (NSDI* 21) 175-200 (April 2021).

[Ref. 2] Deepak Narayanan, Keshav Santhanam, Fiodar Kazhamiaka, Amar Phanishayee, and Matei Zaharia, "Heterogeneity-Aware Cluster Scheduling Policies for Deep Learning Workloads" 14*th USENIX Symposium on Operating Systems Design and Implementation (OSDI* 20) 481-498 (November 2020).

[Ref. 3] Sushant Jain, Alok Kumar, Subhasree Mandal, Joon Ong, Leon Poutievski, Arjun Singh, Subbaiah Venkata, Jim Wanderer, Junlan Zhou, Min Zhu, Jon Zolla, Urs Hölzle, Stephen Stuart, and Amin Vahdat, "B4: Experience with a Globally-Deployed Software Defined Wan" *Proceedings of the ACM SICCOMM* 2013 *Conference on SICCOMM* 3-14 (2013).

[Ref. 4] Chi-Yao Hong, Srikanth Kandula, Ratul Mahajan, Ming Zhang, Vijay Gill, Mohan Nanduri, and Roger Wattenhofer, "Achieving High Utilization with Software-Driven WAN" *Proceedings of the ACM SICCOMM 2013 Conference on SICCOMM* 15-26 (2013).

[Ref. 5] Emilie Danna, Subhasree Mandal, and Arjun Singh, "A practical algorithm for balancing the max-min fairness and throughput objectives in traffic engineering" 2012 *Proceedings IEEE INFOCOM* 846-854 (2012).

[Ref. 6] Umesh Krishnaswamy, Rachee Singh, Nikolaj Bjørner, and Himanshu Raj, "Decentralized cloud wide-area network traffic engineering with BLASTSHIELD" *19th USENIX Symposium on Networked Systems Design and Implementation (NSDI 22)* 325-338 (April 2022).

[Ref. 7] Shubham Chaudhary, Ramachandran Ramjee, Muthian Sivathanu, Nipun Kwatra, and Srinidhi Viswanatha, "Balancing Efficiency and Fairness in Heterogeneous GPU Clusters for Deep Learning" *Proceedings of the Fifteenth European Conference on Computer Systems* (2020).

[Ref. 8] Tan N. Le, Xiao Sun, Mosharaf Chowdhury, and Zhenhua Liu, "AlloX: Compute Allocation in Hybrid Clusters" *Proceedings of the Fifteenth European Conference on Computer Systems* (2020).

[Ref. 9] Dimitri Bertsekas and Robert Gallager, "Data Networks" Prentice-Hall, Inc. (1987).

[Ref. 10] Jordi Ros-Giralt and Wei Kang Tsai, "A theory of convergence order of maxmin rate allocation and an optimal protocol" *Proceedings IEEE INFOCOM 2001. Conference on Computer Communications. Twentieth Annual Joint Conference of the IEEE Computer and Communications Society* (Cat. No. 01CH37213) 2, 717-726 (2001).

[Ref. 11] Dritan Nace, Linh Nhat Doan, Olivier Klopfenstein, and Alfred Bashllari, "Max-Min Fairness in Multi-Commodity Flows" *Comput. Oper. Res.* 35:2, 557-573 (February 2008).

[Ref. 12] Michal Pidro, GAbor Fodor, Pil Nilsson, and Eligijus Kubilinskas, "On Efficient Max-Min Fair Routing Algorithms" *Proceedings of the Eighth IEEE International Symposium on Computers and Communications* 365 (2003).

[Ref. 13] K. E. Batcher, "Sorting Networks and Their Applications" *Proceedings of the Apr. 30-May 2, 1968, Spring Joint Computer Conference* 307-314 (1968).

[Ref. 14] Hongqiang Harry Liu, Srikanth Kandula, Ratul Mahajan, Ming Zhang, and David Gelernter, "Traffic Engineering with Forward Fault Correction" *SIGCOMM Comput. Commun. Rev.* 44:4, 527-538 (August 2014).

[Ref. 15] Deepak Narayanan, Fiodar Kazhamiaka, Firas Abuzaid, Peter Kraft, Akshay Agrawal, Srikanth Kandula, Stephen Boyd, and Matei Zaharia, "Solving Large-Scale Granular Resource Allocation Problems Efficiently with POP" *Proceedings of the ACM SIGOPS 28th Symposium on Operating Systems Principles* 521-537 (2021).

[Ref. 16] Rachee Singh, Manya Ghobadi, Klaus-Tycho Foerster, Mark Filer, and Phillipa Gill, "RADWAN: Rate Adaptive Wide Area Network" *Proceedings of the 2018 Conference of the ACM Special Interest Group on Data Communication* 547-560 (2018).

[Ref. 17] Jeremy Bogle, Nikhil Bhatia, Manya Ghobadi, Ishai Menache, Nikolaj Bjorner, Asaf Valadarsky, and Michael Schapira, "TEAVAR: Striking the Right Utilization-Availability Balance in WAN Traffic Engineering" *Proceedings of the ACM Special Interest Group on Data Communication* 29-43 (2019).

[Ref. 18] Ali Ghodsi, Matei Zaharia, Scott Shenker, and Ion Stoica, "Choosy: Max-min fair sharing for datacenter jobs with constraints" *Proceedings of the 8th ACM European Conference on Computer Systems* 365-378 (2013).

[Ref. 19] Rui Li and Paul Patras, "Max-min fair resource allocation in millimetre-wave backhauls" *IEEE Transactions on Mobile Computing* 19:8, 1879-1895 (2019).

[Ref. 20] Ada Gogu, Dritan Nace, Supriyo Chatterjea, and Arta Dilo, "Max-min fair link quality in WSN based on SINR" *Journal of applied mathematics* 2014 (2014).

[Ref. 21] Alexander Gersht and Robert Weihmayer, "Joint optimization of data network design and facility selection" *IEEE Journal on Selected Areas in Communications* 8:9, 1667-1681 (1990).

[Ref. 22] Stephen Boyd, Stephen P. Boyd, and Lieven Vandenberghe, *Convex optimization* Cambridge University Press (2004).

[Ref. 23] Dimitris Bertsimas and John N. Tsitsiklis, "Introduction to linear optimization" Athena Scientific Belmont, MA 6 (1997).

[Ref. 24] Lavanya Jose, Stephen Ibanez, Mohammad Alizadeh, and Nick McKeown, "A Distributed Algorithm to Calculate Max-Min Fair Rates Without Per-Flow State" *Proc. ACM Meas. Anal. Comput. Syst.* 3:2 (June 2019).

[Ref. 25] Omid Alipourfard, Jiaqi Gao, Jeremie Koenig, Chris Harshaw, Amin Vahdat, and Minlan Yu, "Risk Based Planning of Network Changes in Evolving Data Centers" *Proceedings of the 27th ACM Symposium on Operating Systems Principles* 414-429 (2019).

[Ref. 26] Gurobi Optimization, "Gurobi Optimizer Reference Manual" Gurobi LLC (2022).

[Ref. 27] Zhizhen Zhong, Manya Ghobadi, Alaa Khaddaj, Jonathan Leach, Yiting Xia, and Ying Zhang, "ARROW: restoration-aware traffic engineering" *Proceedings of the 2021 ACM SICCOMM 2021 Conference* 560-579 (2021).

[Ref. 28] Jeremy Bogle, Nikhil Bhatia, Manya Ghobadi, Ishai Menache, Nikolaj Bjorner, Asaf Valadarsky, and Michael Schapira, "TEAVAR: striking the right utilization-availability balance in WAN traffic engineering" *Proceedings of the ACM Special Interest Group on Data Communication* 29-43 (2019).

[Ref. 29] Lavanya Jose, Stephen Ibanez, Mohammad Alizadeh, and Nick McKeown, "A Distributed Algorithm to Calculate Max-Min Fair Rates Without Per-Flow State" *Proc. ACM Meas. Anal. Comput. Syst.* 3:2 (June 2019).

[Ref. 30] "Internet Topology Zoo."

[Ref. 31] Jin Y. Yen, "Finding the K Shortest Loopless Paths in a Network" *Management Science* 17:11, 712-716 (1971).

[Ref. 32] "Microsoft Philly Trace." (2022).

[Ref. 33] Yao Lu, Srikanth Kandula, Arnd Christian Konig, and Surajit Chaudhuri, "Pre-training summarization models of structured datasets for cardinality estimation" *Proceedings of the VLDB Endowment* 15:3, 414-426 (2021).

[Ref. 34] Ryan Marcus, Parimarjan Negi, Hongzi Mao, Chi Zhang, Mohammad Alizadeh, Tim Kraska, Olga Papaemmanouil, and Nesime Tatbul, "Neo: A learned query optimizer" *arXiv preprint arXiv:*1904.03711 (2019).

[Ref. 35] David Applegate and Edith Cohen, "Making Intra-Domain Routing Robust to Changing and Uncertain Traffic Demands: Understanding Fundamental Tradeoffs" *Proceedings of the 2003 Conference on Applications, Technologies, Architectures, and Protocols for Computer Communications* 313-324 (2003).

[Ref. 36] Matthew Roughan, Albert Greenberg, Charles Kalmanek, Michael Rumsewicz, Jennifer Yates, and Yin Zhang, "Experience in Measuring Backbone Traffic Variability: Models, Metrics, Measurements and Meaning" *Proceedings of the 2nd ACM SICCOMM Workshop on Internet Measurement* 91-92 (2002).

[Ref. 37] Emilie Danna, Avinatan Hassidim, Haim Kaplan, Alok Kumar, Yishay Mansour, Danny Raz, and Michal Segalov, "Upward Max-Min Fairness" *J. ACM* 64:1 (March 2017).

[Ref. 38] Srikanth Kandula, Dina Katabi, Bruce Davie, and Anna Charny, "Walking the Tightrope: Responsive yet Stable Traffic Engineering" *SICCOMM Comput. Commun. Rev.* 35:4, 253-264 (August 2005).

[Ref. 39] Yiting Xia, Ying Zhang, Zhizhen Zhong, Guanqing Yan, Chiun Lin Lim, Satyajeet Singh Ahuja, Soshant Bali, Alexander Nikolaidis, Kimia Ghobadi, and Manya Ghobadi, "A Social Network Under Social Distancing: Risk-Driven Backbone Management During COVID-19 and Beyond" *18th USENIX Symposium on Networked Systems Design and Implementation (NSDI* 21) 217-231 (April 2021).

[Ref. 40] Adrian Schad and Marius Pesavento, "Max-min fair transmit beamforming for multi-group multicasting" 2012 *International ITC Workshop on Smart Antennas (WSA)* 115-118 (2012).

[Ref. 41] Sourav Mondal and Marco Ruffini, "A max-min Fair Resource Allocation Framework for Optical x-haul and DU/CU in Multi-tenant O-RANs" *ICC 2022-IEEE International Conference on Communications* 3016-3021 (2022).

[Ref. 42] Nhan-Tam Nguyen, Trung Thanh Nguyen, and Jorg Rothe, "Approximate solutions to max-min fair and proportionally fair allocations of indivisible goods" *Proceedings of the 16th Conference on Autonomous Agents and MultiAgent Systems* 262-271 (2017).

[Ref. 43] Bozidar Radunovic and Jean-Yves Le Boudec, "A unified framework for max-min and max-min fairness with applications" *IEEE/ACM Transactions on networking* 15:5, 1073-1083 (2007).

[Ref. 44] Ilai Bistritz, Tavor Baharav, Amir Leshem, and Nicholas Bambos, "My fair bandit: Distributed learning of max-min fairness with multi-player bandits" *International Conference on Machine Learning* 930-940 (2020).

8. MULTI-RESOURCE, MAX-MIN FAIR ALLOCATION OPTIMIZATION

It is possible to formulate both CS and WAN-TE using the same multi-resource allocation optimization. This appears to be the first such formulation of the multi-resource allocation problem. The formulation is as follows, where the notation and how it maps to each problem domain is tabulated hereinafter.

$$\max_{f} \; \text{fair}\left(a + b^T \cdot f\right) \qquad (8)$$

$$\text{s.t.} \; f_k = \sum_j q_{kj} f_{kj} \forall \, k \in \mathcal{D}$$

$$\sum_{i,j} r_{kj} f_{kj} \mathbb{1}[f_{kj} \text{ uses } e] \le C_e \forall \, e \in \mathcal{E}$$

$$\sum_j f_{kj} \le d_k \forall \, k \in \mathcal{D}$$

$$f_{kj} \ge 0 \forall \, k \in \mathcal{D}$$

Here, the function fair(x) is the function that encodes the max-min fairness objective. It is believed that prior efforts do not present a closed form representation of it. Two candidates are presented (one exact and one that converges in the limit)

TABLE 5

Additional notation for the general multi-resource max-min fair formulation in Section 8.

| Term | Meaning | CS | WAN-TE |
|------|---------|-----|--------|
| a, b | bias and coefficient vector in the objective of fair(.) where $a_k$ and $b_k$ are for the k-th demand. | $a_k = 0$<br>$b_k$ = inverse of priority of job k | $a_k = 0$<br>$b_k = 1$ |
| $q_{kj}$ | the user k's perceived rate when assigned 1 unit on it's j-th sub-demand (i.e., subflow). | $q_{kj}$ = performance of the k-th job when assigned 1 unit of GPU j | $q_{kj} = 1$ |
| $r_{kj}$ | capacity consumed on resource when allocated 1 unit to user k on it's j-th subdemand (i.e., subflow on a path) | $r_{kj}$ = number of workers of job j | $r_{kj} = 1$ |
| $c_e$ | $c_e$: capacity of resource $e \in \mathcal{E}$ | number of workers on the GPU e | capacity of link e |
| $d_k$ | the kth element in $\mathcal{D}$ has a non-negative volume ($d_k$) | $d_k = 1$ | $d_k$ = requested rate for flow k |
| $f_k, f_{kj}$ | $f_k$ = user k's perceived total rate<br>$f_{kj}$ = user k's assinged rate on it's j subdemand | $f_k$ = job k's effective throughput<br>$f_{kj}$: portion of time assigned to user k on GPU j | $f_k$: flow k's total rate<br>$f_{kj}$: flow k's rate on it's j-th path | for this objective in the next section. This formulation is believed to apply to other domains which require multi-resource max-min fair allocation.

9. CLOSED-FORM MAX-MIN FAIR OBJECTIVE

Two closed form representations of the max-min fair objective are presented—one exact, and one that converges to the max-min fair objective in the limit:

$$\text{fair}(f) = \underset{f}{\text{argmax}} \bigcup_{\{\{F\}_A | \{F\}_A \subseteq f\}} \min(\{f_k \mid f_k \in \{F\}_A\}) \qquad (9)$$

Intuitively, this is a collection of maximization problems, where each maximizes the smallest flow in a given subset of f (a total of $2^{|f|}$ maximizations). It is proven next that this objective, in the instance that f are bounded, results in max-min fair allocations.

Proof. Without loss of generality it is assumed that if i<j then $f_i \leq f_j$ for all $f_i$, $f_j \in f$. Suppose the theorem is not true: there exists an allocation f which is optimum as measured by the objective in Section 9 but is not max-min fair. Three scenarios might have caused this;

Case 1. A flow i exists with unbounded $$f_i^*,$$

which can not be true as it is assumed that all the flows are bounded.

Case 2. A flow i exists whose rate can be improved without hurting other flows with ≤rate. One of the constraints in Equation 9 is to maximize $f_i$ as a result such i can not exist.

Case 3. Two flow i and j exists (i<j) with optimal max-min fair rates of $\hat{f}_i$ and $\hat{f}_j$ such that $$\hat{f}_j < f_j^* \text{ and } f_i^* < \hat{f}_i.$$

This means that in the solution from Equation 9, flow j is receiving more than its share and is hurting flow i. This can also not happen since it violates one of the constraints in Equation 9 that maximizes the minimum of i and j. (Note that this holds even if $\hat{f}=\hat{f}_j$ since maximizing the minimum of these two ensures they get equal rates.) As a result, each flow is guaranteed to be bounded, achieve its maximum possible rate and it can not hurt any other flow with less than or equal rate. This is the definition of max-min fairness (f* is max-min fair).

An alternate closed form representation of max-min fair is the following:

$$\text{fair}(f) = \underset{f}{\text{argmax}} \sum_i e^{\sum_{j \neq i} \prod (f_i \leq f_j)} f_i \qquad (10)$$

It is proved that this converges to the max-min fair rate allocations as $\in \to 0$ in Section 10.1.

10. PROOFS

Proofs of the various theorems in this disclosure are now presented.

10.1. Proof of Theorem 1

Theorem 1 states the viability of $\in$-trick. More precisely, as $\in \to 0$, the solution of the optimization Eq 5 converges to the optimal max-min fair rates from solving Eq 4. This is proved as follows.

Proof. Suppose not: the solution t of 5 will be such that $t \neq t^*$, where t* is the optimal max-min fair rate allocation from 4. This implies:

$$\sum_{i=1}^{n} \epsilon t_i^* < \sum_{i=1}^{n} \epsilon t_i - t^*$$

is also part of the feasible set of 5. It is assumed that the indexes i are such that $$t_i^* \leq t_j^* \forall i \leq j.$$

Now it is proved by induction that each $t_i$ is equal to $$t_i^*.$$

For i=0, $$t_0^* - t_0 \leq \sum_{i=1}^{n} \left( \epsilon^i (t_i - t_i^*) \right).$$

Because t* is the max-min fair solution, $$t_0^* \geq t_0 \colon t_0$$

cannot get a higher rate allocation as that contradicts the fact that $$t_0^*$$

is the optimal rate allocation for the smallest flow.

As $\in \to 0$, $$t_0^* \to t_0$$

since $$\sum_{1}^{n} \left( \epsilon^i (t_i - t_i^*) \right) \leq \sum_{i=1}^{n} \beta \epsilon^i$$

and goes to 0 as $\in$ goes to 0. Here $\beta$ is the upper bound on $$t_i - t_i^*.$$

Such a bound exists because the values $$t_i \text{ and } t_i^*$$

are bounded by the constraints in 5 and 4 respectively. Hence, $$t_0^* = t_0.$$

Assume $\forall i \in \{0, \ldots n-1\}$, $$t_i^* = t_i$$

(the induction assumption). Then, $$t_n - t_n^* < 0.$$

It is also known that $t_n$ cannot be more than $$t_n^*$$

as otherwise for some $$i < n \ t_i > t_i^*,$$

which violates the induction assumption (this is because t* is the max-min fair rate).

Thus, t=t*.

10.2. Proof of Theorem 3

If f(w) denotes the solution of solving the weighted waterfilling sub-flow problem with weights w={$w_{ij}$}, then convergence implies that $$w_{ij} = \frac{f_{ij}(w)}{\sum_j f_{ij}(w)}, \tag{11}$$

so that $w_{ij}(t+1) = w_{ij}(t)$ for all i, j.

From the definition of single-path we h waterfilling, it must be that if $f_{ij}$ is bottlenecked at link l, then $$\frac{f_{ij}}{w_{ij}} \geq \frac{f_{kj'}}{w_{kj'}}$$

for all non-zero $f_{kj'}$ going through that link. Using (11) to replace the weights in this inequality and recalling that $\Sigma_j f_{ij} = f_i$, it immediately follows that $f_i \geq f_k$. Since this must hold for every k such that there exists a non-zero subflow $f_{kj'}$ going through link l, it must be that f is bandwidth bottlenecked (see definition before Theorem 3).

10.3. Additional Results Mentioned in Section 3.4

In the discussion after Theorem 3, two results are stated without proof, namely, that the max-min fair rate allocation is bandwidth bottlenecked and that the adaptive waterfiller converges when it finds a bandwidth-bottlenecked rate allocation. Here their proofs are provided in the form of the two following lemmas.

Lemma 1. If f is a max-min fair rate allocation then it must be bandwidth bottlenecked. Proof. Suppose that this is not true and a max-min rate allocation is not bandwidth bottlenecked. This must mean that for some subflow $f_{ij}$ bottlenecked on link l there is another non-zero subflow $f_{kj'}$ going through that link and $f_k > f_i$. This implies that one can increase the subflow $f_{ij}$ at the expense of $f_{kj'}$ ultimately redounding in increasing the allocation to $f_i$ without reducing the allocation to any other equal or smaller allocation (only reducing to the allocation to $f_k$, which was larger to start with). This violates the definition of max-min fair (see Definition 1) and a contradiction results.

Lemma 2. Every bandwidth-bottlenecked rate allocation f is a fixed point of the adaptive waterfiller algorithm. Proof. Assume that f is bandwidth bottlenecked and these flows (and subflows) are used to construct weights $w_{ij} = f_{ij}/(\Sigma_j f_{ij})$. Let us denote by $\tilde{f}$ the solution of solving the weighted waterfilling with those weights. It is desired to show that $f = \tilde{f}$. Notice that the following must hold for a subflow $f_{ij}$ bottlenecked at link l $$\frac{f_{ij}}{w_{ij}} = \frac{f_{ij}}{f_{ij}} \sum_j f_{ij} = f_i \geq f_k = f_k \frac{f_{kj'}}{f_{kj'}} = \frac{f_{kj'}}{w_{kj'}}, \tag{12}$$

where the inequality follows from the definition of bandwidth bottleneck (prior to Theorem 3) and the equality after that one assumes that $f_{kj'}$ is a non-zero subflow also going through link l. Hence, it has been established that for every $f_{ij}$ bottlenecked at link l it must hold that $$\frac{f_{ij}}{w_{ij}} \geq \frac{f_{kj'}}{w_{kj'}}$$

for all non-zero flows $f_{kj'}$ going through that link. This implies that f is a solution to the weighted waterfilling problem. However, as denoted by $\tilde{f}$ the solution to this problem. From uniqueness of the weighted waterfilling solution it must be that $f = \tilde{f}$.

11. EXTENDED EVALUATION

In this section, is provided both additional experiment details as well as an extended evaluation of the suite of network-resource allocators herein.

11.1. Tuning Benchmarks for Performance

Both the SWAN and Danna optimizations are warm-started for iterations>1 in order to reduce the run-time. Gurobi's solver parameters are further tuned using 5% of the traffic demands to achieve the best run-time. The Danna implementation is that of FIG. 2 in [Ref. 5] (i.e., binary and linear search): it was found that this algorithm is faster than the other proposed by the same work (i.e., binary then linear search in FIG. 4) as it is able to find and eliminate more demand-constrained flows. The modified K-waterfilling algorithm uses K=1 which is the fastest and most parallelizeable version of the K-waterfilling [Ref. 29]. In the comparisons with Gavel the disclosed solver is switched to use CVXPY [Ref. 45] to match the Gavel implementation and ensure fair run-time comparisons.

11.2. Evaluation on CS

Figure 21:
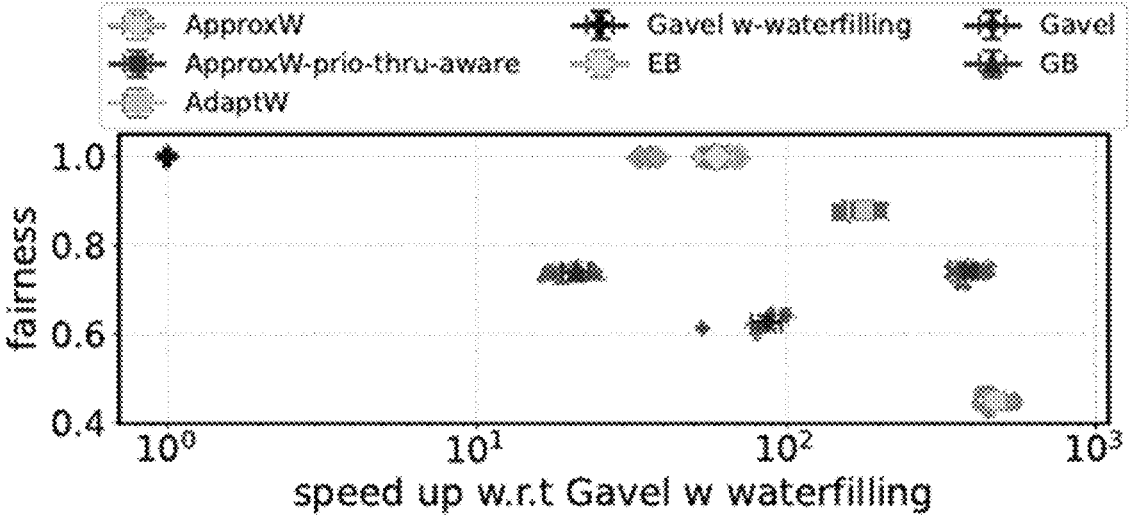
FIG. 21 provides fairness-speed and flow-efficiency comparisons for forty different scenarios with varying numbers of jobs and GPUs.
Figure 21:
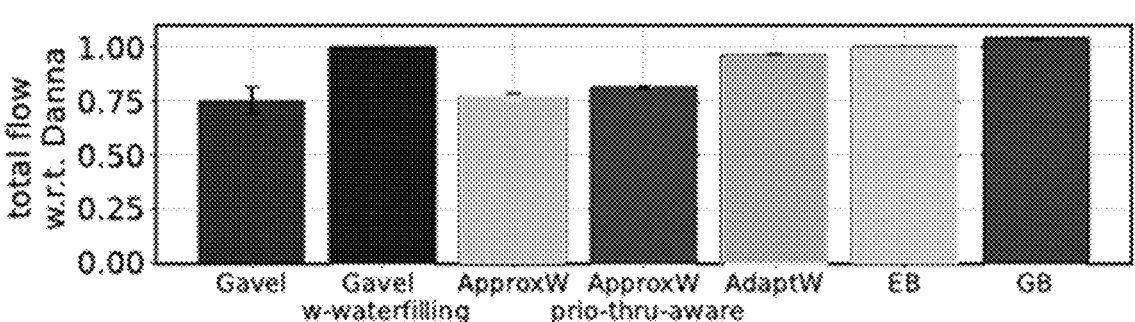

The disclosed suite of network-resource allocators is compared to Gavel and its extension (FIG. 21). The disclosed algorithms are found to Pareto-dominate Gavel and Gavel w-waterfilling. These results are in line with observations from WAN-TE.

FIG. 21 provides fairness-speed and flow-efficiency comparisons for forty different scenarios with varying number of jobs and GPUs. FIG. 22 shows aspects of an example algorithm.

This disclosure is presented by way of example and with reference to the attached drawing figures. Components, process steps, and other elements that may be substantially the same in one or more of the figures are identified coordinately and described with minimal repetition. It will be noted, however, that elements identified coordinately may also differ to some degree. It will be further noted that the figures are schematic and generally not drawn to scale. Rather, the various drawing scales, aspect ratios, and numbers of components shown in the figures may be purposely distorted to make certain features or relationships easier to see.

This disclosure uses the terms 'optimize', 'minimize', and variants thereof. These terms are to be understood in the context of numerical analysis and relevant subfields (e.g., linear and non-linear programming), not in any narrower sense. More specifically, a linear order may be regarded as 'optimized' if its cost of execution is lower than the cost of execution of other, suitably sampled, candidate linear orders. Accordingly, the existence of an 'optimized' linear order does not preclude the possibility that an undiscovered linear order may execute at still lower cost. Likewise, a function is 'minimized' if at least a local minimum is found within a relevant parameter space. Although a numerical algorithm may be configured to avoid being trapped in local minima, so as to arrive at a global minimum over the relevant parameter space, a function may still be regarded as 'minimized' even if an undiscovered lower value of the function exists elsewhere in the parameter space.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for allocating a plurality of network resources to a plurality of network-access demands of a plurality of network guests, the method comprising:

receiving the plurality of network-access demands;

for each of the plurality of network-access demands:

dynamically computing, from among the plurality of network resources, a re-sorted order of network resources associated with the network-access demand by:

for each network resource associated with the network-access demand, determining a flow-rate estimate for the network resource based on an available flow rate of the network resource divided among plural network-access demands on the network resource, dividing a range of possible flow rate assignments of network resources associated with the network-access demand into a plurality of bins using the flow-rate estimates of the network resources associated with the network-access demand to compute one or more bin boundaries of the plurality of bins, assigning each network resource associated with the network-access demand to a corresponding bin of the plurality of bins based on a flow rate of the network resource, and determining the re-sorted order of network resources based on a distribution of the network resources associated with the network-access demand across the plurality of bins, and for each network resource associated with the network-access demand, increasing, in the re-sorted order, an allocation of the network resource to the network-access demand until the network-access demand is saturated, and freezing the allocation of each of the plurality of network resources to the saturated demand; and outputting the frozen allocation of each of the plurality of network resources for each of the plurality of network-access demands.

2. The method of claim 1 wherein the method allocates the plurality of network resources in a single, convex optimization subject to a max-min fairness condition.

3. The method of claim 2 wherein the max-min fairness condition is directed to network neutrality.

4. The method of claim 2 wherein the max-min fairness condition is parametrically relaxable by adjustment of one or more parameters, thereby increasing network efficiency and/or reducing allocation latency, the method further comprising adjusting the one or more parameters.

5. The method of claim 1 wherein each of the plurality of network guests is a guest process executing on the network or a guest user account of the network.

6. The method of claim 1 wherein at least one of the plurality of network resources is a link on a wide-area network (WAN) comprising a plurality of links.

7. The method of claim 1 wherein at least one of the plurality of network resources is a processor of a processor cluster.

8. The method of claim 1 wherein dynamically computing the re-sorted order comprises executing a sorting network to reveal the re-sorted order.

9. The method of claim 1 further comprising outputting an optimality-gap guarantee for fairness of each frozen allocation.

10. The method of claim 1 wherein the re-sorted order ranks each associated network resource by flow rate, and wherein increasing the allocation maximizes the allocation of each associated network resource in order of increasing flow rate.

11. The method of claim 1 wherein the re-sorted order approximately ranks each associated network resource by flow rate, and wherein increasing the allocation maximizes the allocation of each associated network resource in approximate order of increasing flow rate.

12. The method of claim 1 wherein the plurality of bins geometrically increase in bin size.

13. The method of claim 1 wherein the available flow rate is divided into a plurality of equal-sized portions.

14. The method of claim 1 wherein the available flow rate is divided into a plurality of weighted portions.

15. A network-resource allocator configured to allocate a plurality of network resources to a plurality of network-access demands of a plurality of network guests, the network-resource allocator comprising:

an input engine configured to furnish the plurality of network-access demands;

a solver configured to:

receive the plurality of network-access demands from the input engine, and for each of the plurality of network-access demands, dynamically compute a re-sorted order of network resources associated with that network-access demand from among the plurality of network resources by:

for each network resource associated with the network-access demand, determining a flow-rate estimate for the network resource based on an available flow rate of the network resource divided among plural network-access demands on the network resource, dividing a range of possible flow rate assignments of network resources associated with the network-access demand into a plurality of bins using the flow-rate estimates of the network resources associated with the network-access demand to compute one or more bin boundaries of the plurality of bins, assigning each network resource associated with the network-access demand to a corresponding bin of the plurality of bins based on a flow rate of the network resource, and determining the re-sorted order of network resources based on a distribution of the network resources associated with the network-access demand across the plurality of bins, and, for each network resource associated with the network-access demand, increase, in the re-sorted order, an allocation of the associated network resource to the network-access demand until the network-access demand is saturated, and freeze the allocation of each of the plurality of network resources to the saturated network-access demand; and an output engine configured to output each frozen allocation of each of the plurality of network resources for each of the plurality of network-access demands.

16. The network-resource allocator of claim 15 wherein the solver is one of a plurality of integrated solvers differing with respect to fairness, efficiency, and speed, and wherein the plurality of network-access demands is furnished to the solver based on parameters received through the input engine.

17. A method for allocating a plurality of network links to a plurality of network-access demands of a plurality of network guests, the method comprising:

receiving the plurality of network-access demands;

for each of the plurality of network-access demands:

dynamically computing a re-sorted order of network links associated with the network-access demand, from among the plurality of network links by:

dividing a range of possible rate assignments of network links associated with the network-access demand into a plurality of bins, assigning each network link associated with the network-access demand to a corresponding bin of the plurality of bins based on a binning strategy, and determining the re-sorted order of the network links associated with the network-access demand based on a distribution of the network links associated with the network-access demand across the plurality of bins, and for each network link associated with the network-access demand, increasing, in the re-sorted order, a bandwidth allocation of the network link to the network-access demand until the network-access demand is saturated; and outputting each allocation of each of the plurality of network links for each of the plurality of network-access demands.

18. The method of claim 17 wherein increasing the bandwidth allocation allocates the plurality of network links in a single, convex optimization subject to a max-min fairness condition.

* * * * *